(12) United States Patent
Myoga et al.

(10) Patent No.: US 8,913,195 B2
(45) Date of Patent: Dec. 16, 2014

(54) INFORMATION PROCESSING DEVICE, INFORMATION PROCESSING METHOD AND PROGRAM

(76) Inventors: Chika Myoga, Tokyo (JP); Mototsugu Abe, Kanagawa (JP)

( * ) Notice: Subject to any disclaimer, the term of this patent is extended or adjusted under 35 U.S.C. 154(b) by 917 days.

(21) Appl. No.: 13/086,238

(22) Filed: Apr. 13, 2011

(65) Prior Publication Data
US 2011/0255005 A1    Oct. 20, 2011

(30) Foreign Application Priority Data

Apr. 20, 2010    (JP) ................ P2010-096603

(51) Int. Cl.
| | | |
|---|---|---|
| *G06K 9/64* | (2006.01) | |
| *G10L 15/10* | (2006.01) | |
| *G10L 25/00* | (2013.01) | |
| *G06K 9/00* | (2006.01) | |
| *G10L 25/12* | (2013.01) | |
| *G10L 25/18* | (2013.01) | |

(52) U.S. Cl.
CPC ............ *G10L 25/00* (2013.01); *G06K 9/00724* (2013.01); *G10L 25/12* (2013.01); *G10L 25/18* (2013.01)
USPC ......................................... 348/700; 382/154

(58) Field of Classification Search
None
See application file for complete search history.

(56) References Cited

U.S. PATENT DOCUMENTS

| | | | | |
|---|---|---|---|---|
| 7,194,133 B2 * | 3/2007 | Jinnai | ............................ | 382/209 |
| 7,214,868 B2 * | 5/2007 | Abe et al. | ........................ | 84/600 |
| 7,746,359 B2 * | 6/2010 | Kondo et al. | .................. | 345/633 |
| 7,764,828 B2 * | 7/2010 | Sasaki et al. | ................... | 382/154 |
| 7,826,641 B2 * | 11/2010 | Mandella et al. | ............. | 382/106 |
| 8,125,539 B2 * | 2/2012 | Takashima | ................. | 348/231.6 |
| 8,571,378 B2 * | 10/2013 | Morimoto | ..................... | 386/239 |
| 8,627,206 B2 * | 1/2014 | Ogikubo | ....................... | 715/719 |

FOREIGN PATENT DOCUMENTS

JP    2004-191780    7/2004

* cited by examiner

*Primary Examiner* — Jay Patel
*Assistant Examiner* — Reza Aghevli
(74) *Attorney, Agent, or Firm* — Sony Corporation

(57) ABSTRACT

An information processing device includes a change point detection unit which detects change points of a moving image, a transition detection unit which detects transition of a subject, a composition similarity degree information generation unit which generates composition similarity degree information, based on feature amounts of the compositions of the images configuring the moving image included between the change points, a voice similarity degree information generation unit which generates voice similarity degree information, based on a feature amount of the voice data associated with the moving image included between the change points, and a determination unit which determines whether or not the moving image included between the change points is a moving image corresponding to the specific scene, based on the detected transition, the generated composition similarity degree information and the generated voice similarity degree information.

14 Claims, 18 Drawing Sheets

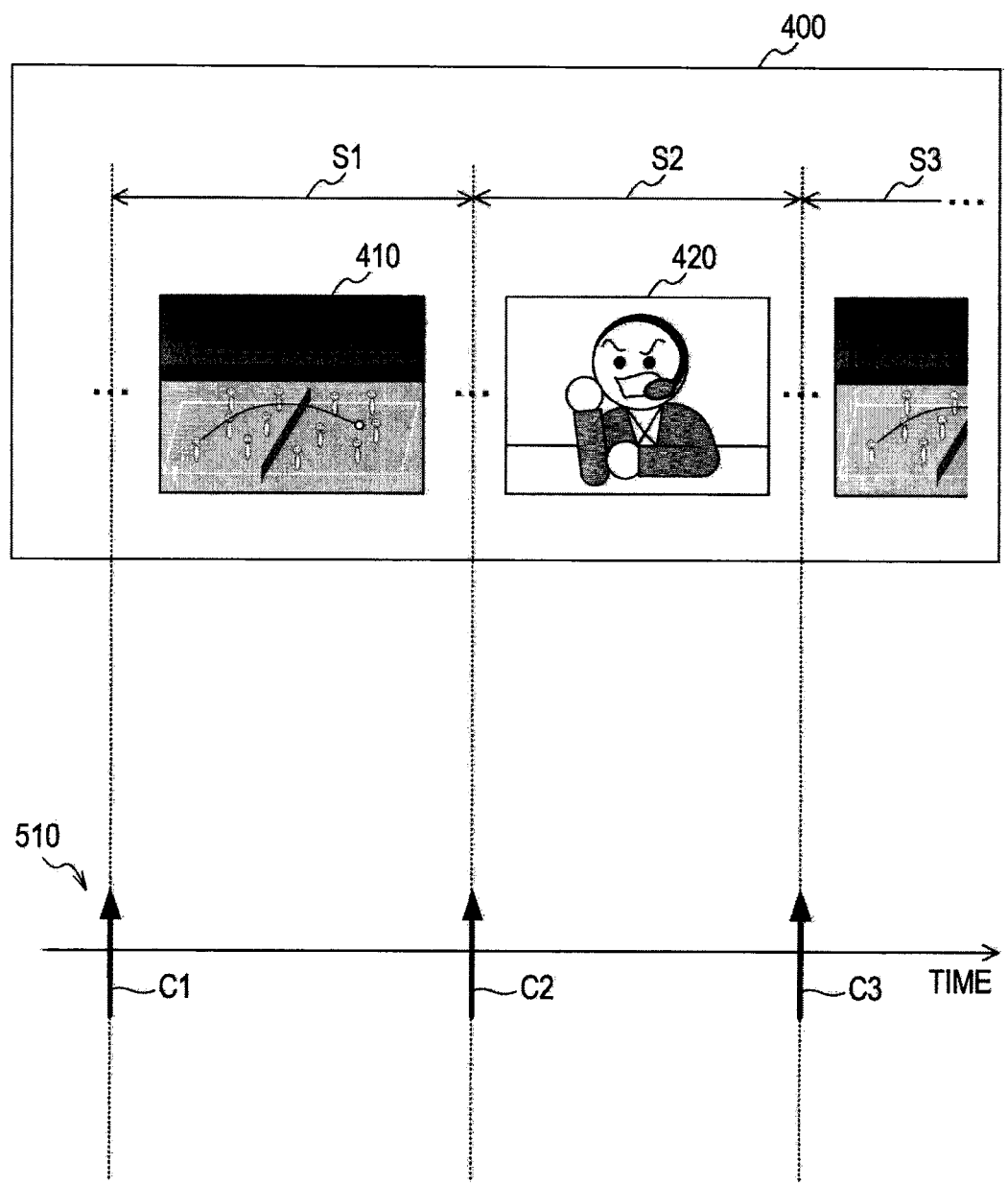

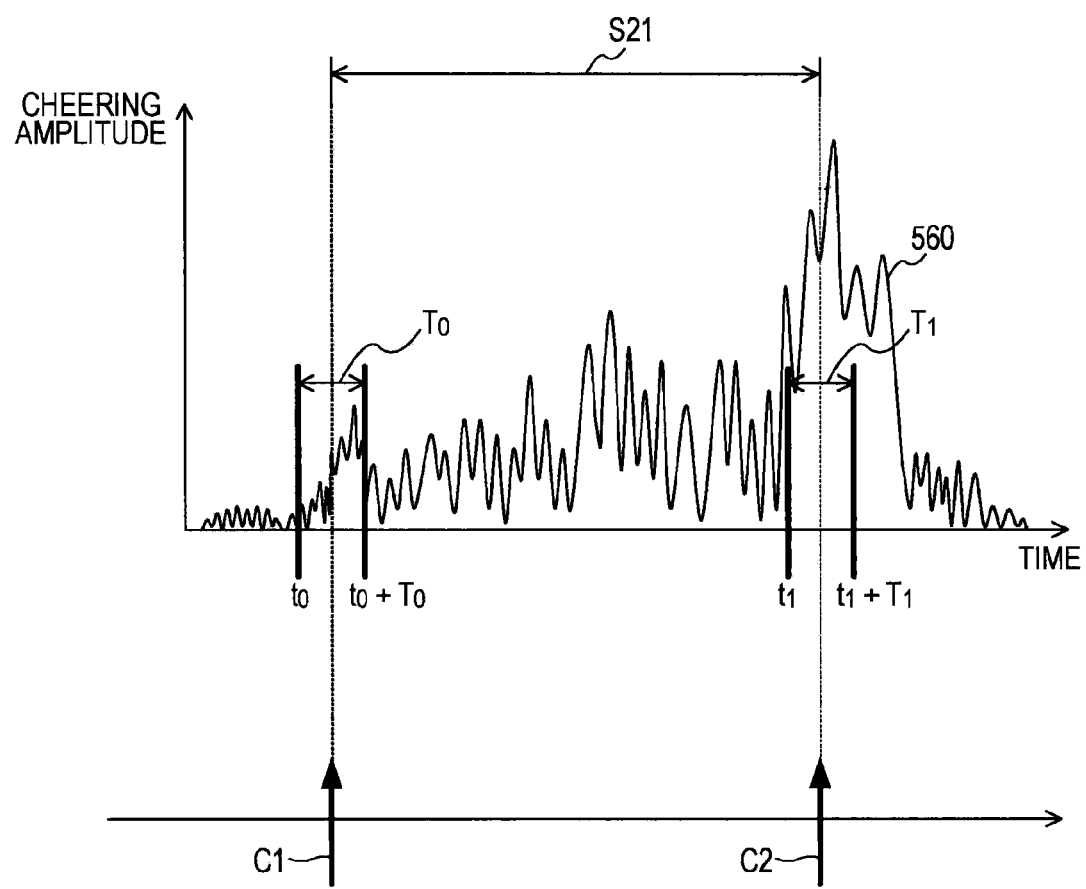

INFORMATION PROCESSING DEVICE, INFORMATION PROCESSING METHOD AND PROGRAM

BACKGROUND OF THE INVENTION

1. Field of the Invention

The present invention relates to an information processing device and, more particularly, to an information processing device and an information processing method for detecting a specific scene in a moving image, and a program for executing the method on a computer.

2. Description of the Related Art

In recent years, there has been an increase in persons who reproduce and enjoy only a desired section when viewing the recorded moving image content of a television broadcast. To this end, various information processing devices having a function for automatically extracting a section desired by a user have been proposed.

For example, a signal processing device for detecting a climax scene in moving image content based on voice data configuring moving image content has been proposed (for example, see Japanese Unexamined Patent Application Publication No. 2004-191780). This signal processing device extracts a section in which a signal amplitude is continuously large in the voice data during a predetermined time or more and determines whether or not the extracted section is a climax based on the signal amplitude and voice quality of the extracted section.

SUMMARY OF THE INVENTION

According to the above-described signal processing device, it is possible to automatically detect an important scene in many events by detecting a sound (a climax sound) generated by the spectators.

In this way, in the above-described signal processing device, it is possible to detect a section (an important scene) heightened by spectators. However, in the above-described signal processing device, it is difficult to extract a section while specific sports are played in which rising to a climax and quieting down are repeated during the course of a game. For example, if a sport, the play of which is watched by spectators during a rally is the moving image content, such a signal processing device may only detect a scene in which a player makes a score after finishing play.

It is desirable to appropriately detect a specific scene.

According to an embodiment of the present invention, there are provided an information processing device including: a change point detection unit which detects change points of a moving image; a transition detection unit which detects transition of a subject included in a plurality of images configuring a moving image included between two adjacent change points among the detected change points; a composition similarity degree information generation unit which generates composition similarity degree information indicating a similarity of degree between compositions of the moving images and a composition of a specific scene, based on feature amounts of the compositions of the images configuring the moving image included between the change points; a voice similarity degree information generation unit which generates voice similarity degree information indicating a similarity of degree between voice data and the voice data of the specific scene, based on a feature amount of the voice data associated with the moving image included between the change points; and a determination unit which determines whether or not the moving image included between the change points is a moving image corresponding to the specific scene, based on the detected transition, the generated composition similarity degree information and the generated voice similarity degree information, an information processing method and a program. By this configuration, it is determined whether or not the moving image included between the change points is the moving image corresponding to the specific scene, based on the transition of the subject, the composition similarity degree information and the voice similarity degree information.

The determination unit may determine that an on play section which is a playing section of a specific sport is the specific scene. By this configuration, it is determined whether or not the playing section of the sport is an on play section.

The determination unit may include an evaluation value generation unit which generates an evaluation value for evaluating the moving image included between the change points, based on the detected transition, the generated composition similarity degree information and the generated voice similarity degree information; and an evaluation value determination unit which compares the evaluation value with a threshold and performs the determination based on the comparison result. Through this configuration, it is determined whether or not it is the moving image corresponding to the specific scene through the evaluation value of the moving image included between the change points generated based on the transition of the subject, the composition similarity degree information and the voice similarity degree information.

The composition similarity degree information generation unit may generate the composition similarity degree information using the result of comparing the brightness of a predetermined region and the brightness of another region in each of the images configuring the moving image included between the change points as the feature amount of the composition. By this configuration, the composition similarity degree information is generated using the result of comparing the brightness of the predetermined region and the brightness of another region in each of the images configuring the moving image included between the change points as the feature amount of the composition.

The composition similarity degree information generation unit may generate the composition similarity degree information using a symmetry degree of a specific direction between a predetermined region and another region in each of the images configuring the moving image included between the change points as the feature amount of the composition. Through this configuration, the composition similarity degree information is generated using the result of comparing the symmetry degree of a specific direction between the predetermined region and another region in each of the images configuring the moving image included between the change points as the feature amount of the composition.

The composition similarity degree information generation unit may generate the composition similarity degree information using a luminance difference between a predetermined region and another region in each of the images configuring the moving image included between the change points as the feature amount of the composition. Through this configuration, the composition similarity degree information is generated using the result of comparing a luminance value between the predetermined region and another region in each of the images configuring the moving image included between the change points as the feature amount of the composition.

The composition similarity degree information generation unit may separate each of the images configuring the moving image included between the change points into a plurality of blocks and generate the composition similarity degree information using an average value of luminance of each block as the feature amount of the composition. Through this configuration, each of the images configuring the moving image included between the change points is separated into the plurality of blocks and the composition similarity degree information is generated using the average value of luminance of each block as the feature amount of the composition.

The transition detection unit may detect horizontal direction motion of an imaging device when capturing the moving image included between the change points as the transition of the subject. Through this configuration, the horizontal direction motion of the imaging device when capturing the moving image included between the change points is detected as the transition of the subject.

The transition detection unit may detect vertical direction motion of an imaging device when capturing the moving image included between the change points as the transition of the subject. By this configuration, the vertical direction motion of an imaging device when capturing the moving image included between the change points is detected as the transition of the subject.

The transition detection unit may compare an object image of the moving image included between the change points with another image adjacent or close to the object image on a time axis and detect the transition of the subject based on the comparison result. Through this configuration, the object image of the moving image included between the change points is compared with another image adjacent or close to the object image on the time axis and the transition of the subject is detected based on the comparison result.

A priority applying unit which sets the moving image included between the change points which is determined as the moving image corresponding to the specific scene as a specific moving image and applies priority of the specific moving image to the specific moving image based on the detected transition, the generated composition similarity degree information and the generated voice similarity degree information may be included. Through this configuration, priority is applied to the moving image which is determined as the moving image corresponding to the specific scene.

According to another embodiment of the present invention, there is provided an information processing device including: a change point detection unit which detects change points of a moving image; a transition detection unit which detects transition of a subject included in a plurality of images configuring a moving image included between two adjacent change points among the detected change points; a composition similarity degree information generation unit which generates composition similarity degree information indicating similarity degrees between compositions of the moving images and a composition of a specific scene, based on feature amounts of the compositions of the images configuring the moving image included between the change points; a voice similarity degree information generation unit which generates voice similarity degree information indicating a similarity of degree between voice data and the voice data of the specific scene, based on a feature amount of the voice data associated with the moving image included between the change points; a determination unit which determines whether or not the moving image included between the change points is a moving image corresponding to the specific scene, based on the detected transition, the generated composition similarity degree information and the generated voice similarity degree information; and a display control unit which performs control such that the moving image included between the changes points which is determined as the moving image corresponding to the specific scene is displayed on a display unit, based on the determination result of the determination unit. Through this configuration, it is determined whether or not the moving image included between the change points is the moving image corresponding to the specific scene, based on the transition of the subject, the composition similarity degree information and the voice similarity degree information, and the moving image which is determined to correspond to the specific scene is displayed.

According to the embodiments of the present invention, it is possible to appropriately detect a specific scene and obtain excellent effects.

BRIEF DESCRIPTION OF THE DRAWINGS

FIG. 3 is a schematic diagram showing an example of analyzed moving image content and a cut change point of this moving image in the first embodiment of the present invention;

FIG. 11 is a schematic diagram showing an example of feature amount generation based on voice data of each cut section by the section feature amount generation unit according to the first embodiment of the present invention;

DESCRIPTION OF THE PREFERRED EMBODIMENTS

Hereinafter, modes (hereinafter, referred to as embodiments) for carrying out the present invention will be described. The description will be given in the following order.

1. First Embodiment (Information Processing Control: Example of Detecting On Play Section of Volleyball Broadcast)
2. Second Embodiment (Information Processing Control: Example of Adding Importance Degree to On Play Section)

1. First Embodiment

Functional Configuration Example of Information Processing Device

Figure 1:
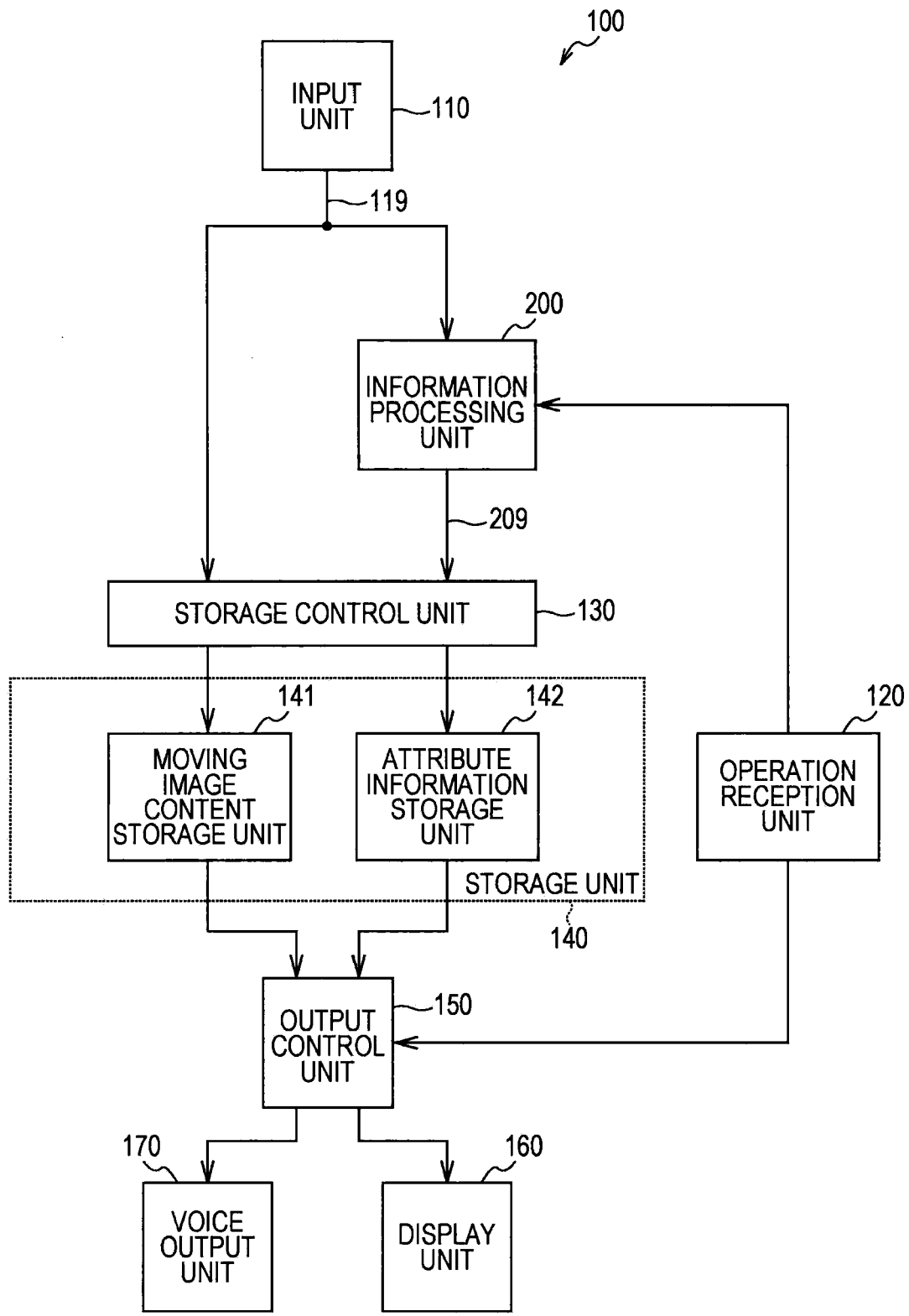
FIG. 1 is a block diagram showing a functional configuration example of an information processing device according to a first embodiment of the present invention.

FIG. 1 is a block diagram showing a functional configuration example of an information processing device 100 according to a first embodiment of the present invention. The information processing device 100 includes an input unit 110, an operation reception unit 120, a recording control unit 130, a storage unit 140, an information processing unit 200, an output control unit 150, a display unit 160, and a voice output unit 170.

The information processing device 100 is, for example, realized by an image viewing device (for example, hard disk built-in television) for recording or displaying externally input moving image content.

The input unit 110 receives moving image content. For example, a broadcast signal of a television broadcast, a recorded moving image of a broadcast signal or the like is input by the input unit 110. The input unit 110 supplies the input moving image content to the information processing unit 200 and the recording control unit 130 through a signal line 119.

The operation reception unit 120 receives an operation input from a user and supplies an operation signal according to the operation input to the units of the information processing device 100. The operation reception unit 120 receives, for example, an operation for starting detection of an on play section and supplies a signal regarding detection start to the information processing unit 200. The operation reception unit 120 receives an operation for displaying the detected on play section and supplies a signal (display control signal) for controlling display to the output control unit 150.

The information processing unit 200 performs information processing for detecting a specific scene (here, an on play section) of moving image content. The information processing unit 200 generates attribute information (on play section attribute information) indicating the on play section based on the moving image content supplied from the input unit 110 and supplies the generated on play section attribute information to the recording control unit 130. The information processing unit 200 will be described with reference to FIGS. 2 to 10.

The recording control unit 130 performs recording control of the moving image content and the on play attribute information in the storage unit 140. When the on play section attribute information is supplied from the information processing unit 200, the recording control unit 130 associates the moving image content supplied from the input unit 110 with the on play section attribute information and records the moving image content in the storage unit 140.

The storage unit 140 records the moving image content and the on play section attribute information supplied from the recording control unit 130. The storage unit 140 includes a moving image content storage unit 141 and an attribute information storage unit 142.

The moving image content storage unit 141 records the moving image content and supplies the recorded moving image content to the output control unit 150.

The attribute information storage unit 142 records on play section attribute information and supplies the recorded on play section attribute information to the output control unit 150.

The output control unit 150 controls the output to the user of an image viewed as well as a voice. The output control unit 150 supplies image data configuring the moving image content supplied from the moving image content storage unit 141 to the display unit 160. In addition, the output control unit 150 supplies voice data configuring the moving image content supplied from the moving image content storage unit 141 to the voice output unit 170. In the case where the on play section is displayed in association with the moving image content, the output control unit 150 generates an image based on the on play section attribute information supplied from the attribute information storage unit 142 and supplies the image data regarding the generated image to the display unit 160. An example of the image generated based on the on play section attribute information will be described with reference to FIGS. 12 and 13.

The display unit 160 displays a variety of images based on the image data supplied from the output control unit 150. The display unit 160 is realized by, for example, a color liquid crystal panel. The display unit 160 displays, for example, a screen or the like for schematically displaying the position of the on play section of the moving image content.

The voice output unit 170 outputs voice based on voice data supplied from the output control unit 150.

That is, the information processing device 100 detects a section (a section in a time axis) in which a game is being played (on play) in the taken moving image content (moving image file) of a sport.

Although the image viewing device for recording or displaying the input moving image content is described as the information processing device 100, the present invention is not limited thereto. For example, a device for generating on play section attribute information (for example, moving image reproduction of a personal computer or the like) with respect to already held moving image content, such as a Digital Versatile Disk (DVD), may be considered. A device for recording a broadcast such as a DVD recorder may be considered.

Functional Configuration Example of Information Processing Unit

Figure 2:
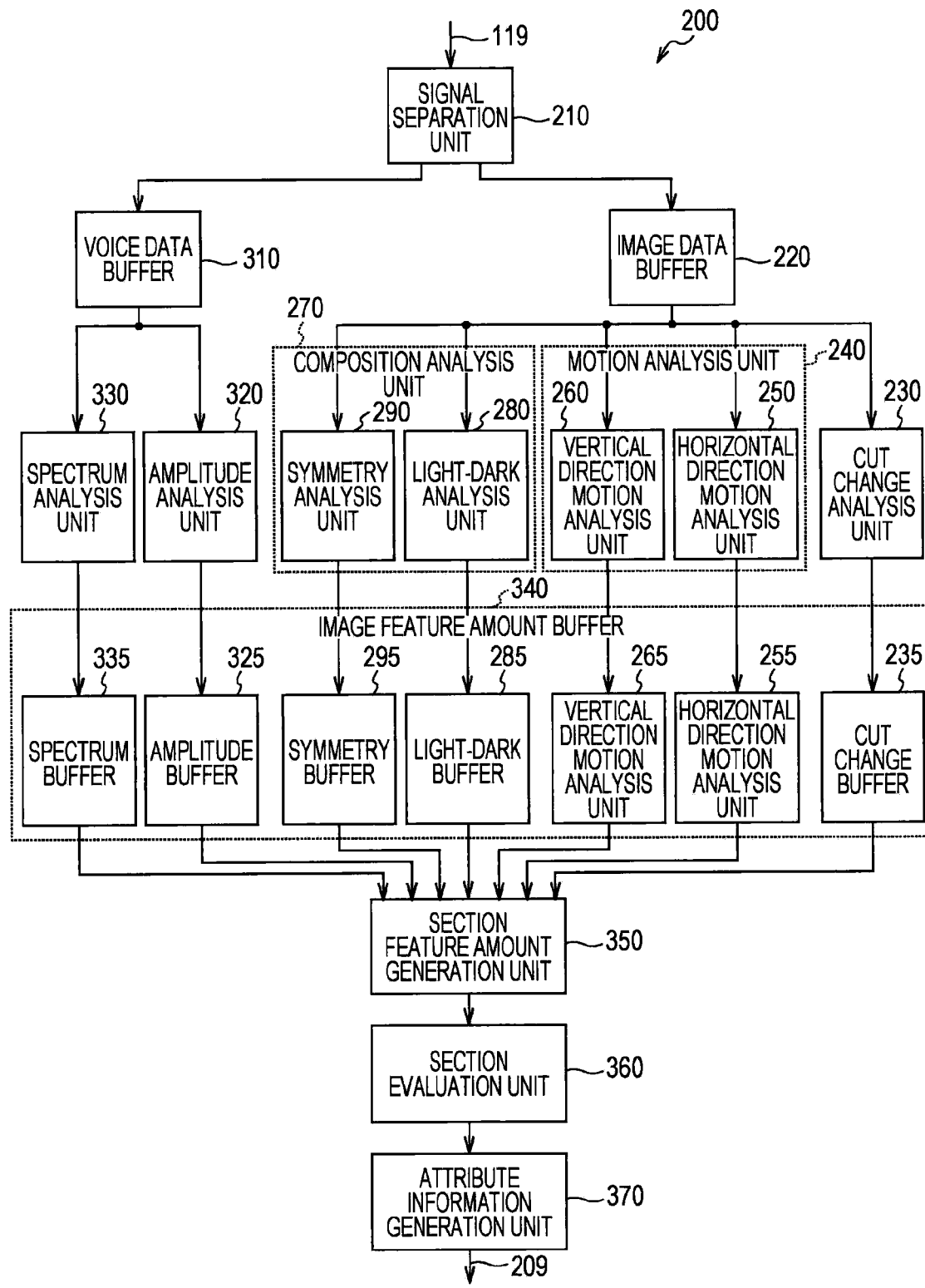
FIG. 2 is a block diagram showing a functional configuration example of an information processing unit according to the first embodiment of the present invention.

FIG. 2 is a block diagram showing a functional configuration example of the information processing unit 200 according to the first embodiment of the present invention.

The information processing unit 200 includes a signal separation unit 210, an image data buffer 220, a cut change analysis unit 230, a motion analysis unit 240 and a composition analysis unit 270. The information processing unit 200 further includes a voice data buffer 310, an amplitude analysis unit 320, a spectrum analysis unit 330, an image feature amount buffer 340, a section feature amount generation unit 350, a section evaluation unit 360, and an attribute information generation unit 370.

The signal separation unit 210 separates the moving image content supplied from the input unit 110 into image data and voice data. The signal separation unit 210 supplies the separated image data to the image data buffer 220. The signal separation unit 210 supplies the separated voice data to the voice data buffer 310.

The image data buffer 220 holds the image data. The image data buffer 220 holds the image data in frame units (image units). The image data buffer 220 is realized by, for example, a First-In First-Out (FIFO) type queue for outputting the oldest (furthest away in time) frame in an input order among held frames when one frame is input. The image data buffer 220 supplies the held image to the cut change analysis unit 230, the motion analysis unit 240 and the composition analysis unit 270.

The cut change analysis unit 230 analyzes whether or not an object image is a cut change point (change point). The cut change analysis unit 230, for example, compares an image of an analysis object (analysis object image) with a preceding image (adjacent image) in a time axis and detects a rapidly changed image so as to analyze whether or not the object image is the cut change point. As a method of detecting a cut change by the cut change analysis unit 230, for example, a method (for example, see Japanese Unexamined Patent Application Publication No. 2008-83894) of determining a cut change using a histogram similarity degree and a space correlation image similarity degree between images. In this method, it is determined whether an image change between the analysis object image and the adjacent image is a cut change based on the histogram similarity degree and the space correlation image similarity degree between the analysis object image and the adjacent image. The cut change analysis unit 230 generates information (cut change feature amount) indicating whether or not the analysis object image is a cut change point. The cut change analysis unit 230 supplies the generated cut change feature amount to the cut change buffer 235 of the image feature amount buffer 340. An example of generating the cut change feature amount will be described with reference to FIG. 3. The cut change analysis unit 230 is an example of a change point detection unit described in the claims.

The motion analysis unit 240 analyzes motion of a camera for capturing an image. The motion analysis unit 240, for example, compares an analysis object image with an adjacent image, calculates a change amount between the two images, analyzes motion of the camera, and generates information (motion feature amount) about motion. That is, the motion analysis unit 240 detects transition of a subject by the comparison between the analysis object image and the adjacent image so as to analyze motion of the camera. The motion feature amount becomes a similar value if motion of the analysis object image is close to motion of an image of an on play section and thus indicates a similarity degree between image compositions of the analysis object image and the on play section. As a method of analyzing motion by the motion analysis unit 240, a method of superimposing the analysis object image and the adjacent image while shifting pixels and obtaining a shift amount when correlation is highest is applicable. As a method of analyzing motion by the motion analysis unit 240, a method of using a motion vector calculated by a block matching method or the like is applicable. The motion analysis unit 240 includes a horizontal direction motion analysis unit 250 for analyzing motion of a horizontal direction and a vertical direction motion analysis unit 260 for analyzing motion of a vertical direction. The motion analysis unit 240 is an example of a transition detection unit described in the claims.

The horizontal direction motion analysis unit 250 analyzes motion of the horizontal direction of the camera (imaging device) for capturing an image. That is, the horizontal direction motion analysis unit 250 detects transition of a subject due to motion of the horizontal direction of the camera so as to analyze motion of the horizontal direction of the camera. The horizontal direction motion analysis unit 250 generates information (horizontal direction motion feature amount) indicating a motion amount of the horizontal direction of the analysis object image based on the analysis result. The horizontal direction motion analysis unit 250 supplies the generated horizontal direction motion feature amount to a horizontal direction motion buffer 255 of the image feature amount buffer 340. An example of generating the horizontal direction motion feature amount will be described with reference to FIGS. 4A to 4C.

The vertical direction motion analysis unit 260 analyzes motion of the vertical direction of the camera for capturing an image. That is, the vertical direction motion analysis unit 260 detects transition of a subject due to motion of the vertical direction of the camera so as to analyze the motion of the vertical direction of the camera. The vertical direction motion analysis unit 260 generates information (vertical direction motion feature amount) indicating a motion amount of the vertical direction of the analysis object image based on the analysis result. The vertical direction motion analysis unit 260 supplies the generated vertical direction motion feature amount to a vertical direction motion buffer 265 of the image feature amount buffer 340. An example of generating the vertical direction motion feature amount will be described with reference to FIGS. 5A to 5C.

The composition analysis unit 270 analyzes the composition of the analysis object image. For example, the composition analysis unit 270 analyzes the composition of the analysis object image and separates the analysis object image into a plurality of blocks. The composition analysis unit 270 calculates a luminance average of each block and weighted-adds the luminance average of each block so as to calculate information (composition feature amount) about the composition of the image. The composition feature amount becomes a similar value when the composition of the analysis object image is close to the composition of the image of the on play section and thus indicates a similarity degree between the compositions of the analysis object image and the image of the on play section. The composition analysis unit 270 includes a light-dark analysis unit 280 for analyzing light and darkness of the analysis object image and a symmetry analysis unit 290 for analyzing image symmetry of the analysis object image. The composition analysis unit 270 is an example of a composition similarity degree information generation unit described in the claims.

The light-dark analysis unit 280 analyzes composition of light and darkness of the analysis object image. The light-dark analysis unit 280 generates information (light-dark feature amount) about a contrast between an upper portion and a lower portion of the analysis object image using the luminance of the analysis object image. The light-dark analysis unit 280 compares the brightness of a predetermined region (upper portion) and the brightness of another region (lower portion) of the analysis object image so as to generate the light-dark feature amount. That is, the light-dark analysis unit 280 generates the light-dark feature amount using a difference (contrast) between the brightness of the predetermined region and the brightness of another region of the analysis object image as a composition feature amount. The light-dark analysis unit 280 supplies the generated light-dark feature amount to the light-dark buffer 285 of the image feature amount buffer 340. The light-dark feature amount will be described with reference to FIGS. 7A and 7B.

The symmetry analysis unit 290 analyzes the composition of the image symmetry of the analysis object image. The symmetry analysis unit 290 generates a symmetry feature amount which is information about right-and-left symmetry of the analysis object image using the luminance of the analysis object image. That is, the symmetry analysis unit 290 generates a symmetry feature amount based on a symmetry degree in a specific direction (right and left) of the analysis object image. That is, the symmetry analysis unit 290 generates a symmetry feature amount using a symmetry degree in the specific direction of the analysis object image as a composition feature amount. The symmetry analysis unit 290 supplies the generated symmetry feature amount to a symmetry buffer 295 of the image feature amount buffer 340. The symmetry feature amount will be described with reference to FIGS. 8A and 8B.

The voice data buffer 310 holds voice data. The voice data buffer 310 holds voice data in one sample unit (voice data of one frame period). The voice data buffer 310 is realized by, for example, a First-In First-Out (FIFO) type queue for outputting an oldest (furthest away in time) sample in an input order among held samples when one sample is input. The voice data buffer 310 supplies the held voice data to the amplitude analysis unit 320 and the spectrum analysis unit 330.

The amplitude analysis unit 320 analyzes intensity of sound of the voice data. The amplitude analysis unit 320 analyzes the intensity of the sound of the image corresponding to the sample based on voice data of one sample. The amplitude analysis unit 320, for example, disperses the voice data of one sample in time and calculates a root mean square so as to analyze the intensity of sound. The amplitude analysis unit 320 generates information (amplitude feature amount) indicating the analyzed intensity of the sound of the voice data (one sample) based on the analysis result. The amplitude analysis unit 320 supplies the generated amplitude feature amount to an amplitude buffer 325 of the image feature amount buffer 340. An example of generating the amplitude feature amount will be described with reference to FIG. 9.

The spectrum analysis unit 330 analyzes the tone of voice data. The spectrum analysis unit 330 analyzes the tone of an image corresponding to the sample based on the voice data of one sample. The spectrum analysis unit 330, for example, calculates a short time discrete spectrum using the voice data of one sample so as to analyze the tone. The spectrum analysis unit 330 generates information (spectrum feature amount) indicating the analyzed tone of the voice data (one sample) based on the analysis result. The spectrum analysis unit 330 supplies the generated spectrum feature amount to a spectrum buffer 335 of the image feature amount buffer 340. An example of generating the spectrum feature amount will be described with reference to FIG. 9. The amplitude analysis unit 320 and the spectrum analysis unit 330 are an example of a voice similarity information generation unit described in the claims. In addition, the amplitude feature amount and the spectrum feature amount become similar values when the voice data of an analysis object has the same feature as the voice data of the on play section and thus indicates a similarity of degree between two pieces of voice data.

The image feature amount buffer 340 holds the feature amount of each image generated based on the image data and the voice data. The image feature amount buffer 340 includes the cut change buffer 235, the horizontal direction motion buffer 255, the vertical direction motion buffer 265, the light-dark buffer 285, the symmetry buffer 295, the amplitude buffer 325 and the spectrum buffer 335.

The cut change buffer 235 holds a cut change feature amount of each image (each frame) supplied from the cut change analysis unit 230. The cut change buffer 235 supplies the held cut change feature amount to the section feature amount generation unit 350.

The horizontal direction motion buffer 255 sequentially holds the horizontal direction motion feature amount of each image (one frame) supplied from the horizontal direction motion analysis unit 250. The horizontal direction motion buffer 255 supplies the held horizontal direction motion feature amount to the section feature amount generation unit 350.

The vertical direction motion buffer 265 sequentially holds the vertical direction motion feature amount of each image supplied from the vertical direction motion analysis unit 260. The vertical direction motion buffer 265 supplies the held vertical direction motion feature amount to the section feature amount generation unit 350.

The light-dark buffer 285 sequentially holds the light-dark feature amount of each image supplied from the light-dark analysis unit 280. The light-dark buffer 285 supplies the held light-dark feature amount to the section feature amount generation unit 350.

The symmetry buffer 295 sequentially holds the symmetry feature of each image supplied from the symmetry analysis unit 290. The symmetry buffer 295 supplies the held symmetry feature amount to the section feature amount generation unit 350.

The amplitude buffer 325 sequentially holds the amplitude feature amount of one sample supplied from the amplitude analysis unit 320. The amplitude buffer 325 supplies the held amplitude feature amount to the section feature amount generation unit 350.

The spectrum buffer 335 sequentially holds the spectrum feature amount of one sample supplied from the spectrum analysis unit 330. The spectrum buffer 335 supplies the held spectrum feature amount to the section feature amount generation unit 350.

The section feature amount generation unit 350 generates the feature amount (section feature amount) of each section. For example, the section feature amount generation unit 350 acquires each feature amount of the image of a section sandwiched between cut change points from the image feature amount buffer 340. The section feature amount generation unit 350 generates one value (section feature amount) indicating the degree to which a section of an analysis object is an on play section using the acquired feature amount of each image. The section feature amount generation unit 350 supplies the generated section feature amount to the section evaluation unit 360. An example of generating the section feature amount will be described with reference to FIGS. 10 and 11.

The section evaluation unit 360 evaluates whether or not the section of the analysis object is the on play section based on the section feature amount. The section evaluation unit 360 holds a predetermined threshold in advance and compares the value of the section feature amount with the threshold so as to evaluate the section of the analysis object. The section evaluation unit 360 supplies information (for example, a start time and an end time of the section) about a section which is evaluated as the on play section to the attribute information generation unit 370. The section feature amount generation unit 350 and the section evaluation unit 360 are an example of a determination unit described in the claims.

The attribute information generation unit 370 generates on play section attribute information based on the information about the on play section supplied from the section evaluation unit 360. For example, the attribute information generation unit 370 generates the on play section attribute information including the number of the on play section, the start time of the on play section and the end time of the on play section. The attribute information generation unit 370 supplies the generated on play section attribute information to the recording control unit 130 through a signal line 209.

Cut Change Analysis Example of Cut Change Analysis Unit 230

FIG. 3 is a schematic diagram showing an example of analyzed moving image content and a cut change point of this moving image in the first embodiment of the present invention.

In the first embodiment of the present invention, detection of a play section of a broadcast program of volleyball is considered. In the first embodiment of the present invention, a scene (section) from serve to making a score through the rally is referred to as an "on play section" and other scene is referred to as an "off play section". The broadcast program of volleyball includes an image in which a court during playing is taken, an image in which a commentator of a game is taken, an image of replay of commentary of the play, a commercial image, and the like.

In the same figure, moving image content (moving image content 400) which is an analysis object and a position (cut change information 510) of a time axis indicating a cut change point detected by the analysis of the moving image content are schematically shown.

The moving image content 400 is moving image content of the broadcast program of volleyball. The moving image content 400 includes two sections (sections S1 and S3) which are on play sections and one section (section S2) which is an off play section. In the moving image content 400, an image (image 410) in which a playing player is taken as an image (an image (representative image) of one frame within the section S1) showing the content of section S1 is shown. Similarly, an image (image 420) in which a commentator of a game is taken is shown as an image (an image (representative image) of one frame within the section S1) showing the content of the section S2.

The cut change information 510 schematically shows the position of the cut change point analyzed by the cut change analysis unit 230 on a time axis. In the cut change information 510, a horizontal axis denotes a time of moving image content and three cut change points (cut change points C1 to C4) detected by the cut change analysis unit 230 are shown.

Now, the analysis of cut change by the cut change analysis unit 230 will be described. The cut change analysis unit 230 compares an image (n-th frame) of an analysis object with a preceding ((n−1)-th frame) on a time axis so as to analyze whether or not the frame of the analysis object is a cut change point. For example, the cut change analysis unit 230 generates a histogram (color histogram of a luminance signal Y, a color difference signal (blue) Cb and a color difference signal (red) Cr extracted for each frame) of the image of the analysis object and a histogram of the preceding image. The cut change analysis unit 230 calculates a difference between the generated histograms. Subsequently, the cut change analysis unit 230 analyzes whether or not a point between two images is a cut change point, based on whether or not the difference between the generated histograms exceeds a predetermined threshold. That is, the cut change analysis unit 230 analyzes that the cut change point is detected if the difference between the histograms exceeds the predetermined threshold and set the value of the cut change feature amount (C[n]) of the analyzed image to "1". In contrast, if the difference between the histograms does not exceed the predetermined threshold, it is analyzed that the cut change point is not detected and the value of the cut change feature amount (C[n] of the analyzed image is set to "0".

With respect to an image in which cut change points C1 to C3 of the moving image content 400, a cut change feature amount having a value of "1" is generated. In contrast, with respect to other images, a cut change feature amount having a value of "0" is generated.

In this way, the cut change point is analyzed by the cut change analysis unit 230 and the cut change feature amount indicating the analysis result is held in the cut change buffer 235.

Horizontal Direction Motion Analysis Example of Horizontal Direction Motion Analysis Unit 250

Figure 4A:
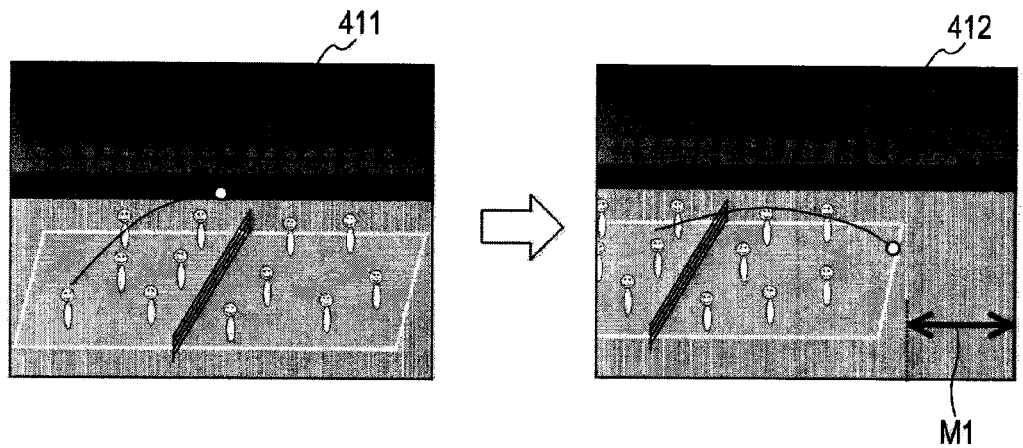
FIGS. 4A to 4C are schematic diagrams showing an example of motion of a horizontal direction of a camera for capturing moving image content analyzed in a horizontal direction motion analysis unit according to the first embodiment of the present invention.
Figure 4B:
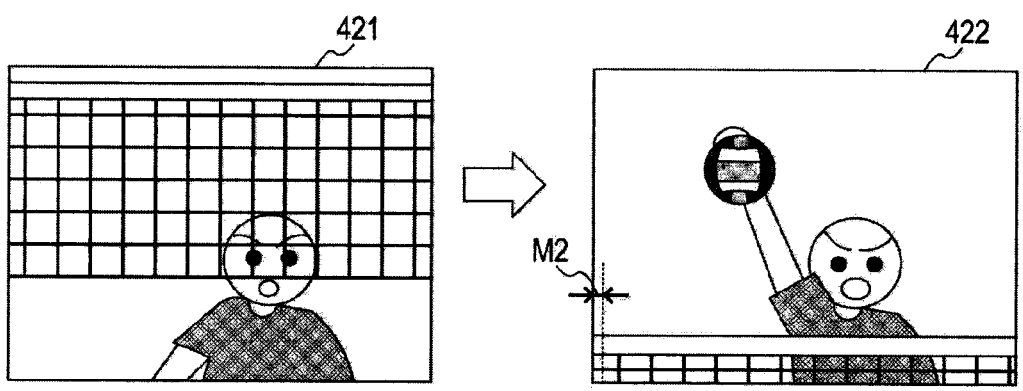
Figure 4C:
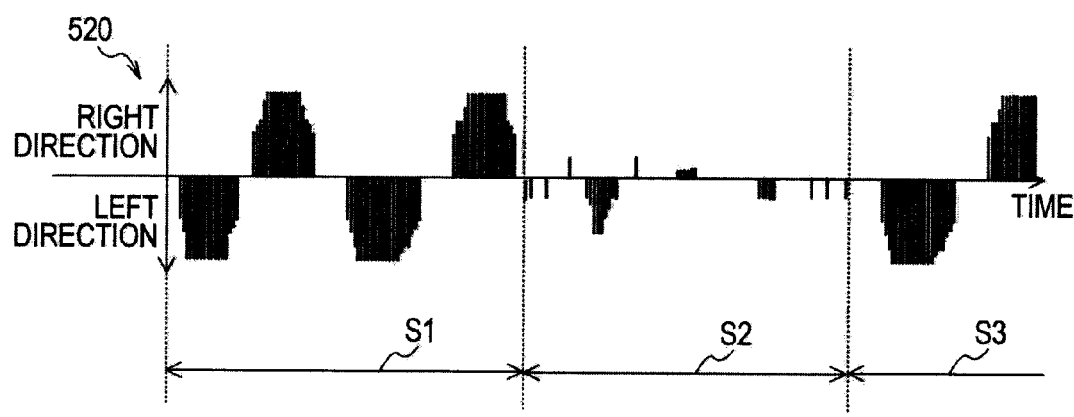

FIGS. 4A to 4C are schematic diagrams showing an example of motion of the horizontal direction of the camera for capturing moving image content analyzed in the horizontal direction motion analysis unit 250 according to the first embodiment of the present invention.

In FIG. 4A, two images (image 411 and image 412) schematically showing the motion of a camera of an off play section are shown. In the image 412, a motion amount (horizontal direction motion amount M1) of the horizontal direction of the camera from a time when the image 411 is captured to a time when the image 412 is captured is shown.

Now, the motion of the horizontal direction of the camera of the on play section will be described. In general, in the relay of volleyball, since a ball comes and goes through a court net, a camera operates to follow the ball to both sides (in the image 421, in a horizontal direction) of the net so as to capture a player. That is, in the on play section, if the play continues, the camera continuously moves to right and left (in a horizontal direction). With respect to the motion of the horizontal direction of the camera, the amount of the right-and-left motion becomes a predetermined amount by a limitation in the court width or the like.

In FIG. 4B, two images (image 421 and image 422) schematically showing the motion in the horizontal direction of the camera of an off play section are shown. In the image 421 and the image 422, a replay image of an attack scene is shown as an example of the off play section. In the image 422, a motion amount (horizontal direction movement direction M2) of the horizontal direction of the camera from a time when the image 421 is captured to a time when the image 422 is captured is captured is shown.

Now, the motion in the horizontal direction of the camera of the off play section will be described. In the off play section, for example, there are many scenes in which a person or a ball is followed with high magnification, such as the scene in which the commentator is taken (for example, the image 420 shown in FIG. 3) or the relay image (image 421) of the attack scene. In such a scene, as denoted by the horizontal direction motion amount M2, the motion of the horizontal direction hardly occurs. Although a scene in which the ball is followed in the horizontal direction (for example, a replay image at the instant that the ball falls to the court) may exist, the right-and-left motion is not repeated as in the on play section.

In FIG. 4C, characteristics (horizontal direction motion characteristics 520) of motion in the horizontal direction of the camera of the moving image content is shown. In the horizontal direction motion characteristics 520, a horizontal direction denotes a time of moving image content, a vertical direction denotes the size of motion to a right direction (plus side) and a left direction (minus side), and the motion amount in the horizontal direction analyzed by the horizontal direction motion analysis unit 250 is shown.

As denoted by the horizontal direction motion characteristics 520, the motion in the horizontal direction of the on play section (sections S1 and S3) is largely in the right and left direction and a predetermined amount of right-and-left motion is repeated. In addition, the motion in the horizontal direction in the off play section and (section S2) is not frequent and is small. There is no regularity in the motion of the horizontal direction of the off play section.

Now, the analysis of the motion of the horizontal direction by the horizontal direction motion analysis unit 250 will be described. The horizontal direction motion analysis unit 250 compares an image (n-th frame) of an analysis object with a preceding image ((n−1)-th frame) on a time axis so as to analyze the motion of the horizontal direction of the image of the analysis object. For example, the horizontal direction motion analysis unit 250 superimposes the analysis object image and the adjacent image while shifting the pixel and sets the shift amount of an image having highest correlation to the horizontal direction motion feature amount ($G_H[n]$) of the analysis object image. That is, as the motion of the camera is increased, the horizontal direction motion feature amount ($G_H[n]$) of the analysis object image is increased.

In this way, the motion of the horizontal direction of the camera is analyzed by the horizontal direction motion analysis unit 250 and the horizontal direction motion feature amount indicating the analysis result is held in the horizontal direction motion buffer 255.

Vertical Direction Motion Analysis Example of Vertical Direction Motion Analysis Unit 260

Figure 5A:
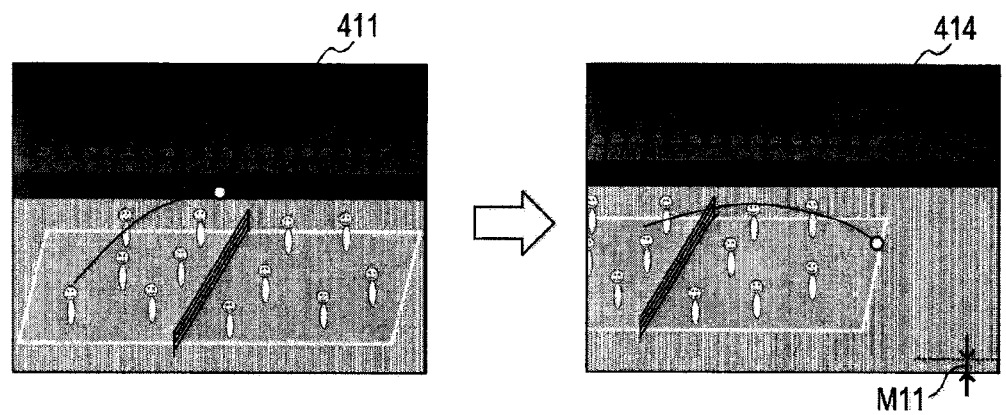
FIGS. 5A to 5C are schematic diagrams showing an example of motion of a vertical direction of a camera for capturing moving image content analyzed in a vertical direction motion analysis unit according to the first embodiment of the present invention.
Figure 5B:
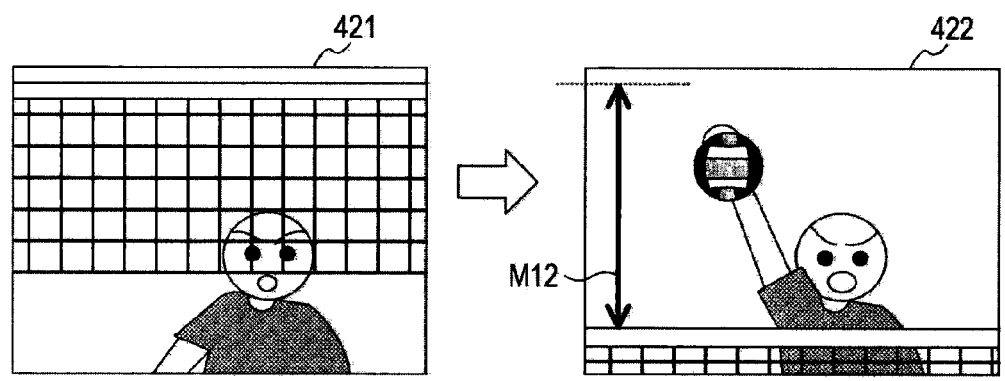
Figure 5C:
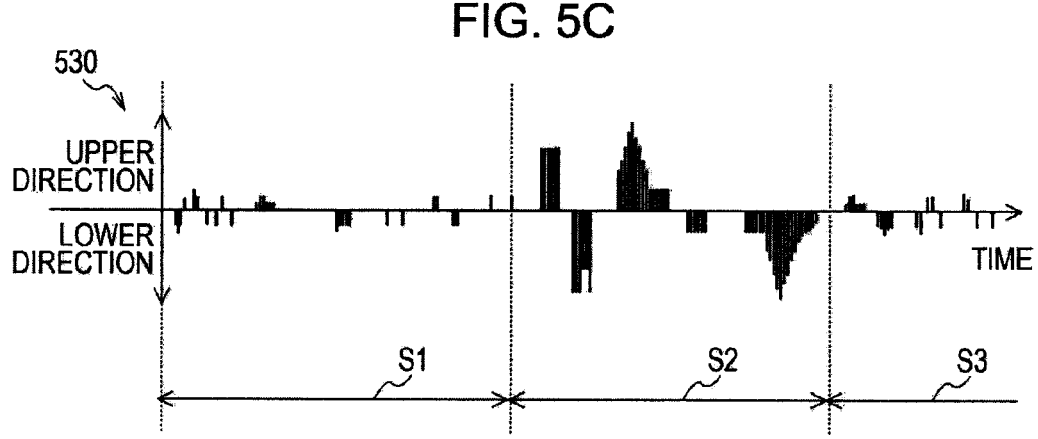

FIGS. 5A to 5C are schematic diagrams showing an example of the motion in the vertical direction of the camera for capturing the moving image content analyzed in the vertical direction motion analysis unit 260 according to the first embodiment of the present invention.

In FIG. 5A, similarly to FIG. 4A, two images (image 411 and image 412) of an off play section are shown. In the image 412 of FIG. 5A, a motion amount (vertical direction motion amount M11) of the vertical direction of the camera from a time when the image 411 is captured to a time when the image 412 is captured is shown.

Now, the motion in the vertical direction of the camera of the on play section will be described. As described with reference to FIG. 4A, in the on play section, the camera continuously moves to right and left. However, in the on play section, the camera does not substantially move up and down (in the vertical direction) in order to capture a wide region with low magnification so as to know a position where the ball falls.

In FIG. 5B, similarly to FIG. 4B, two images (image 421 and image 422) of the off play section are shown. In the image 422 of FIG. 5B, a motion amount (vertical direction motion direction M12) in the vertical direction of the camera from a time when the image 421 is captured to a time when the image 422 is captured to a time when the image 422 is captured is shown.

Now, the motion of the vertical direction of the camera of the off play section will be described. As described with reference to FIG. 4B, in the off play section, there are many scenes in which the ball is followed with high magnification, such as the relay image of the attack scene. To this end, for example, as denoted by the vertical direction motion amount M12, large motion of the vertical direction may occur.

In FIG. 5C, characteristics (vertical direction motion characteristics 530) of motion in the vertical direction of the camera of the moving image content is shown. In the vertical direction motion characteristics 530, a horizontal direction denotes a time of moving image content, a vertical direction denotes the size of motion to an upper direction (plus side) and a lower direction (minus side), and the motion amount of the vertical direction analyzed by the vertical direction motion analysis unit 260 is shown.

As denoted by the vertical direction motion characteristics 530, the motion in the vertical direction of the on play section (sections S1 and S3) is frequent and is small. The motion in the vertical direction of the off play section (section S2) may be large sometimes, but there is no regularity in the motion.

Now, the method of analyzing the motion of the vertical direction by the vertical direction motion analysis unit 260 is equal to the method of analyzing the motion in the horizontal direction by the horizontal direction motion analysis unit 250 shown in FIGS. 4A to 4C and thus the description thereof will be omitted. That is, as the motion of the camera is increased, the vertical direction motion feature amount ($G_v[n]$) of the analysis object image is increased.

In this way, the motion in the vertical direction of the camera is analyzed by the vertical direction motion analysis unit 260 and the vertical direction motion feature amount indicating the analysis result is held in the vertical direction motion buffer 265.

Example of Image Separation by Composition Analysis Unit 270

Figure 6:
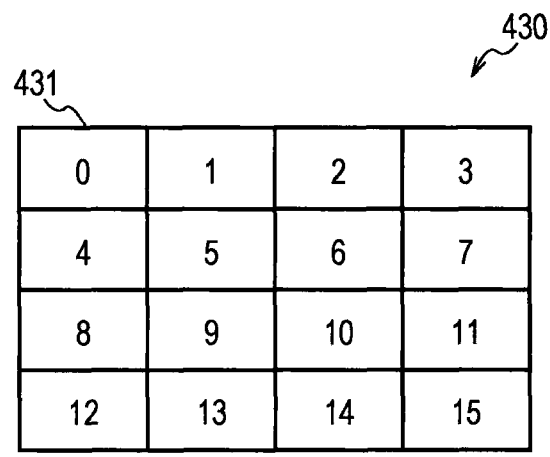
FIG. 6 is a schematic diagram showing an example of image separation by a composition analysis unit according to the first embodiment of the present invention.

FIG. 6 is a schematic diagram showing an example of image separation by the composition analysis unit 270 according to the first embodiment of the present invention.

In the same figure, an image (image 430) of a separation object and 16 blocks (blocks 431) when the image of the separation object is separated into 16 portions are shown. Numbers described in the blocks 431 (number 0 to number 15) indicate block numbers.

In this way, the composition analysis unit 270 separates the image into a plurality of blocks and then performs composition analysis.

Example of Image Light-Dark Analysis by Light-Dark Analysis Unit 280

Figures 7A, 7B:
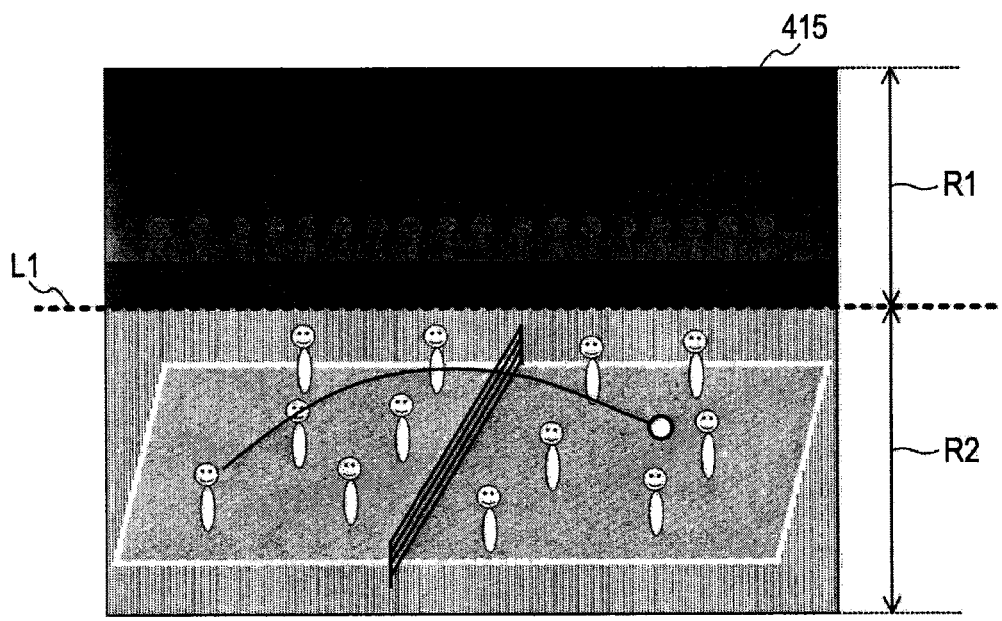
FIGS. 7A and 7B are schematic diagrams showing an example of image light-dark analysis by a light-dark analysis unit according to the first embodiment of the present invention.

FIGS. 7A and 7B are schematic diagrams showing an example of image light-dark analysis by the light-dark analysis unit 280 according to the first embodiment of the present invention.

In FIG. 7A, an image (image 415) indicating the composition of the image in the on play section is shown. In the image 415, a line (line L1) indicating a boundary between a spectator stand and a court captured in the image, a region (region R1) indicating a range in which the spectator stand is captured, and a region (region R2) indicating a range in which the court is captured.

Now, the composition of light and darkness of the image of the on play section will be described. As shown in the image 415, in the image of the play of the broadcast program of volleyball, the court is captured in the lower portion of the image and the spectator stand is also captured in the upper portion of the image. The illumination of the court is light such that the players of the volleyball play easily. In contrast, since it is not necessary to make the illumination of the spectator stand as light as the court, the illumination of the spectator stand is darker than that of the court. That is, in the composition of light and darkness of the image of the on play section, the upper portion of the image becomes a dark image due to low luminance and the lower portion of the image becomes a light image due to high luminance.

In FIG. 7B, light-dark characteristics (light-dark characteristics 540) of the image configuring the moving image content is shown. In the light-dark characteristics 540, a horizontal axis denotes a time of the moving image content, a vertical axis denotes a contrast (contrast is increased as it is increased), and a contrast of each image is shown.

As denoted by the light-dark characteristics 540, the contrast of the on play section (section S1 and S3) is consistently large because the motion of the vertical direction of this section is small. In contrast, the contrast of the off play section (section S2) is small because many images with a very small contrast, such as replay images, exist in this section.

Now, the analysis of the composition of light and darkness by the light-dark analysis unit 280 will be described. First, the light-dark analysis unit 280 separates the analysis object image (n-th frame) into a plurality (K) of blocks as shown in FIG. 6. The light-dark analysis unit 280 calculates an average $Y_k$ of luminance of each block. Subsequently, the light-dark analysis unit 280 calculates the light-dark feature amount $P_v[n]$, for example, using the following Equation 1:

$$P[n] = \Sigma_{k=0}^{K-1} W_k Y_k \tag{1}$$

where W denotes a predetermined weight. K denotes the number of blocks separated from the image. k denotes the block number of the separated block. For example, the block numbers (number 0 to number 15) shown in FIG. 6 are used.

If the number K of blocks is "16", the light-dark analysis unit 280 calculates the light-dark feature amount $P_v[n]$ using the weight W shown in the following Equation 2.

$$W = \begin{pmatrix} 1 & 1 & 1 & 1 \\ 1 & 1 & 1 & 1 \\ -1 & -1 & -1 & -1 \\ -1 & -1 & -1 & -1 \end{pmatrix} \tag{2}$$

If the light-dark feature amount $P_v[n]$ is calculated using the weight W shown in Equation 2 and Equation 1, the light-dark feature amount $P_v[n]$ becomes a large minus value if the contrast between the upper portion and the lower portion of the image is large. In contrast, the light-dark feature amount $P_v[n]$ becomes a value close to "0" if the contrast between the upper portion and the lower portion of the image is small.

In this way, the composition of light and darkness of the image is analyzed from the luminance by the light-dark analysis unit 280 and the light-dark feature amount indicating the analysis result is held in the light-dark buffer 285.

Example of Image Symmetry Analysis by Symmetry Analysis Unit 290

Figure 8A:
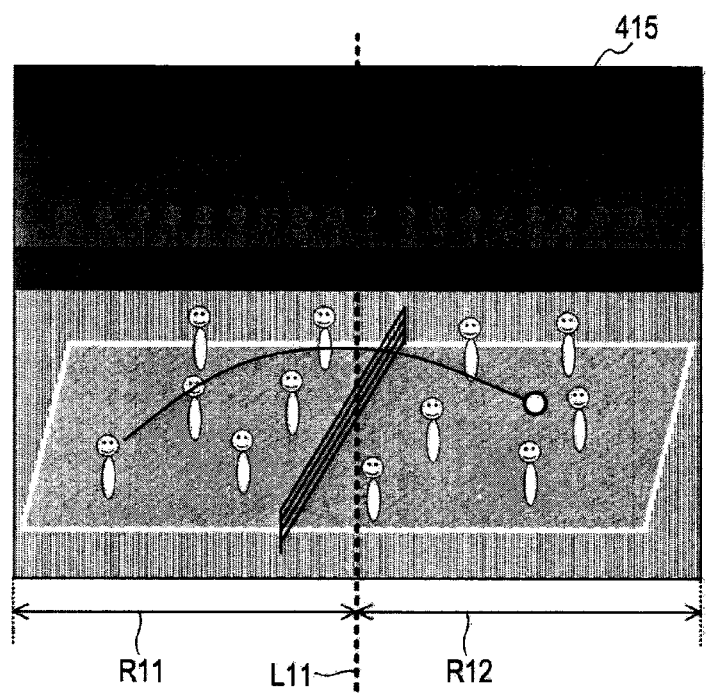
FIGS. 8A and 8B are schematic diagrams showing an example of image symmetry analysis by a symmetry analysis unit according to the first embodiment of the present invention.
Figure 8B:
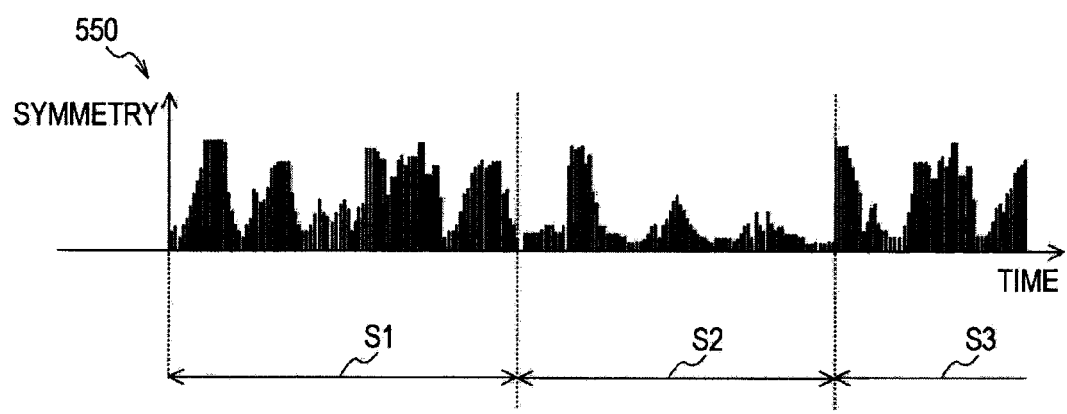

FIGS. 8A and 8B are schematic diagrams showing an example of image symmetry analysis by the symmetry analysis unit 290 according to the first embodiment of the present invention.

In FIG. 8A, similarly to FIG. 7A, an image (image 415) indicating the composition of the image in the on play section is shown. In the image 415 of FIG. 8A, a line (line L11) bisecting the image in the horizontal direction, a region (region R11) indicating a left half range of the bisected image, and a region (region R12) indicating a right half range.

Now, the composition of the image symmetry of the on play section will be described. As shown in the image 415, in the image of the play of the broadcast program of volleyball, since the entire court is frequently taken, right-and-left symmetry of the image is high.

In FIG. 8B, symmetry characteristics (symmetry characteristics 550) of the image of the moving image content is shown. In the symmetry characteristics 550, a horizontal axis denotes a time of moving image content, a vertical axis denotes right-and-left symmetry (right-and-left symmetry is increased as it is increased), and the symmetry of each image is shown.

As denoted by the symmetry characteristics 550, the symmetry of the on play section (sections S1 and S3) is generally higher than the symmetry of the off play section (section S2) because the entire court is frequently captured.

Now, the analysis of the symmetry by the symmetry analysis unit 290 will be described. The symmetry analysis unit 290 calculates a symmetry feature amount $P_H[n]$ using the above-described Equation 1, similarly to the calculation of the light-dark feature amount by the light-dark analysis unit 280. However, the weight W used in the symmetry analysis unit 290 is different from the weight W (Equation 2) used in the light-dark analysis unit 280. The symmetry analysis unit 290 calculates the symmetry feature amount $P_H[n]$, for example, using the weight W shown in the following Equation 3.

$$W = \begin{pmatrix} -1 & -1 & 1 & 1 \\ -1 & -1 & 1 & 1 \\ -1 & -1 & 1 & 1 \\ -1 & -1 & 1 & 1 \end{pmatrix} \tag{3}$$

If the symmetry feature amount $P_H[n]$ is calculated using the weight W shown in Equation 3 and Equation 1, the symmetry feature amount $P_H[n]$ becomes a value close to "0" if the right-and-left symmetry of the image is large.

In this way, the composition of the right-and-left symmetry of the image is analyzed by the symmetry analysis unit 290 and the symmetry feature amount indicating the analysis result is held in the symmetry buffer 295.

Although the light-dark feature amount and the symmetry feature amount are calculated using the average of the luminance in FIGS. 7A to 8B, the present invention is not limited thereto. For example, color information (for example, RGB (G (green), R (red) and B (Blue)) may be extracted from the image and the light-dark feature amount and the symmetry feature amount may be calculated using the color information.

Example of Change in Cheering in on Play Section

Figure 9:
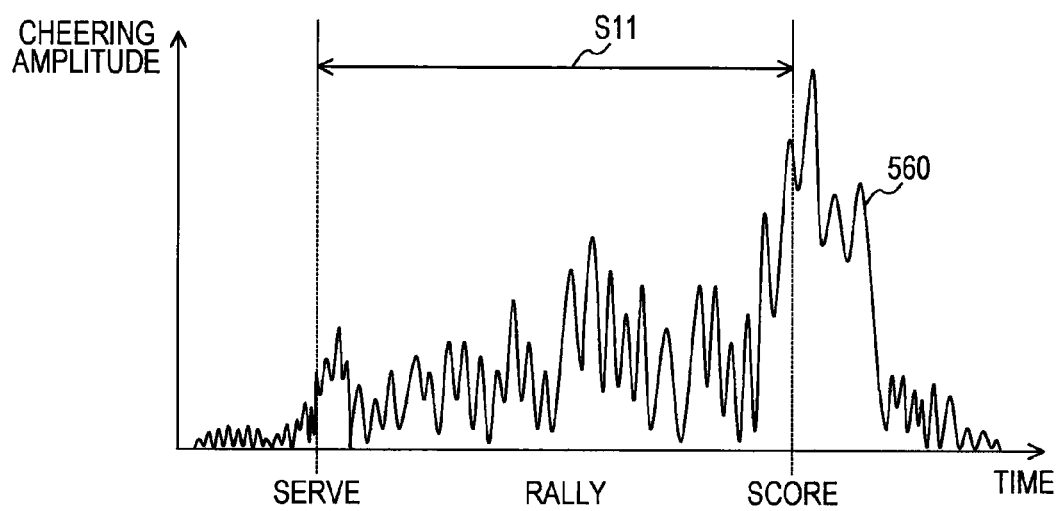
FIG. 9 is a schematic graph showing an example of a change in cheering in an on play section of a volleyball broadcast analyzed by an amplitude analysis unit and a spectrum analysis unit according to the first embodiment of the present invention.

FIG. 9 is a schematic graph showing an example of a change in cheering in the on play section of the volleyball broadcast analyzed by the amplitude analysis unit 320 and the spectrum analysis unit 330 according to the first embodiment of the present invention.

In the same figure, a horizontal axis denotes the time of the moving image content, a vertical axis denotes the cheering amplitude, and cheering characteristics 560 indicating change in the cheering amplitude of the on play section (section S11) is shown.

In the cheering characteristics 560, the cheering amplitude is smallest before the start of the on play section (section S11). In addition, at a start timing (for example, a serve timing) of the on play section, the cheering amplitude is slightly increased as compared to the off play section up to now. During the rally after a serve, the cheering amplitude is increased as compared to the off play section. In addition, at an end timing (for example, a timing when a score is made) of the on play section (section S11), cheering is further increased. Cheering upon making a score continues for a moment and then cheering decreases.

Based on such voice data, the amplitude analysis unit 320 and the spectrum analysis unit 330 calculate a feature amount of sound quality (cheering amplitude and tone).

Now, the calculation of the amplitude feature amount by the amplitude analysis unit 320 will be described. The amplitude analysis unit 320 acquires the voice data of one sample (time corresponding to one frame period (time T)) from the voice data buffer 310. This time T indicates an image gap (frame gap) and is 1/F seconds if a frame per second is F. The amplitude analysis unit 320 calculates the amplitude feature amount A[n] using the acquired voice data. The amplitude analysis unit 320 calculates the amplitude feature amount A[n] using the following Equation 4:

$$A[n] = \sqrt{\frac{1}{M}\sum_{m=0}^{M-1} x_m^2} \quad (4)$$

where M denotes a total amount of dispersed time in a time T. In addition, m denotes a sample number indicating dispersed time. That is, the sample number m becomes the number of a value of "0 to M−1". $x_m$ denotes voice data of a time corresponding to the sample number m.

As shown in the above-described Equation 4, in the amplitude analysis unit 320, a root mean square is calculated using the voice data corresponding to the analysis object image and the calculated result is supplied to the amplitude buffer 325 as an amplitude feature amount.

Next, calculation of the spectrum feature amount by the spectrum analysis unit 330 will be described. The spectrum analysis unit 330 acquires voice data of one sample from the voice data buffer 310, similarly to the amplitude analysis unit 320. The spectrum analysis unit 330 calculates a spectrum feature amount F[k; n] using the acquired voice data. The spectrum analysis unit 330 calculates the spectrum feature amount F[k; n] using the following Equation 5:

$$F[k;n] = \sum_{m=0}^{M-1} x_m e^{-j\frac{2\pi mk}{M}} \quad (5)$$

where k denotes a spectrum number indicating a dispersed frequency. That is, the spectrum number k becomes the number of a value "0 to K−1" if a total number of dispersed frequencies is K.

As shown in the above-described Equation 5, in the spectrum analysis unit 330, a short time dispersal spectrum is calculated using the voice data corresponding to the analysis object image and the calculated result is supplied to the spectrum buffer 335 as a spectrum feature amount.

The calculation of the amplitude feature amount by the amplitude analysis unit 320 is not limited thereto. For example, the voice data may be subjected to Fast Fourier Transform (FFT) and a square root of a total sum of the values obtained by the squaring power of each frequency component may be set to an amplitude feature amount. Alternatively, before calculating the amplitude feature amount, an unnecessary frequency component may be removed from the voice data signal using a band pass filter so as to generate voice data of a necessary band in order to the amplitude of the cheering or the like, and a root mean square may be calculated from the generated voice data.

The calculation of the spectrum feature amount by the spectrum analysis unit 330 is not limited thereto and, for example, may be performed using FFT or Liner Predictive Coding (LPC).

As shown in FIGS. 3 to 9, in the information processing unit 200, the analysis object image is analyzed in terms of the cut change point, the motion of the camera, the composition of the image and the cheering and the analyzed result is held for each image. That is, in the information processing unit 200, information shown in the following Equation 6 is generated as a feature amount (image feature amount Q[n]) of the analysis object image (n-th frame).

$$Q[n] = \{C[n], G_V[n], G_H[n], P_V[n], P_H[n], A[n], F[k;n]\} \quad (6)$$

In this way, the feature amount of each image (frame) is calculated, If the feature amount of the image of at least one cut section (section sandwiched between cut change points) is held in each buffer, the section feature amount generation unit 350 generates the feature amount (section feature amount) of the cut section.

Example of Feature Amount Generation Based on Image Data of Each Cut Section by Section Feature Amount Generation Unit FIGS. 10A to 10E are schematic diagrams showing an example of feature amount generation based on the image data of each cut section by the section feature amount generation unit 350 according to the first embodiment of the present invention.

In the same figure, for example, the calculation of the feature of the section S1 and the section S2 of the moving image content 400 shown in FIG. 3 will be described.

Figure 10A:
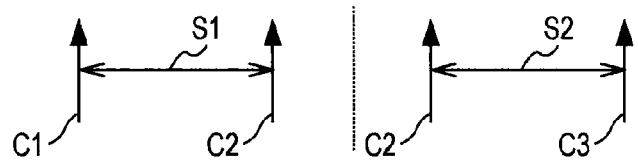
FIGS. 10A to 10E are schematic diagrams showing an example of feature amount generation based on image data of each cut section by a section feature amount generation unit according to the first embodiment of the present invention.

In FIG. 10A, a schematic diagram (cut change feature amount) showing a cut change point is shown in order to identify the section S1 and the section S2. In FIG. 10A, two cut change points (cut change points C1 and C2) for identifying the section S1 and two cut change points (cut change points C2 and C3) for identifying the section S2 are shown.

Now, a method of acquiring the feature amount of each image from the image feature amount buffer 340 in the case where the section feature amount generation unit 350 generates the section feature amount will be described. The section feature amount generation unit 350 acquires the feature amount of each image of one cut section from each buffer of the image feature amount buffer 340 if the feature amount of the image of one cut section is analyzed. That is, in the case where a new cut change feature amount having a value of "1" is held in the cut change buffer 235, the section feature amount generation unit 350 acquires the feature amount of the image of one cut section having that cut change point as an end point from each buffer of the image feature amount buffer 340.

Figure 10B:
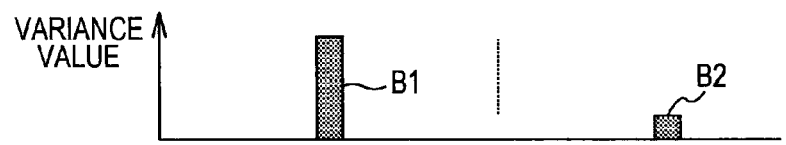

FIG. 10B, a graph (horizontal direction motion feature amount (section)) schematically showing the variance of the motion of the horizontal direction of the camera of the section S1 and the section S2 is shown. In this graph, a vertical axis denotes the level of the variance of the right-and-left motion of the camera of the section and the feature amount (horizontal direction motion feature amount (section S1) B1) of the section S1 calculated from the horizontal direction motion feature amount of each image of the section S1 is shown. In this graph, as a comparison object of the horizontal direction motion feature amount (section S1) B1, the horizontal direction motion feature amount (horizontal direction motion feature amount (section S2) B2) of the section S2 calculated from the horizontal direction motion feature amount of each image of the section S2 is shown.

Now, an example of calculating the horizontal direction motion feature amount of each section by the section feature amount generation unit 350 will be described. First, the section feature amount generation unit 350 calculates an average "/$G_H[N_{cut}]$" of the horizontal direction motion of the camera of the section of the calculation object from the horizontal direction motion feature amount of each image of a section of a calculation object using the following Equation 7. Here, "/" is used as a symbol (in Equation 7, over-bar) indicating the average of $G_H[N_{cut}]$:

$$\overline{G}_H[N_{cut}] = \frac{1}{n_1 - n_0} \sum_{n=n_0}^{n_1} G_H[n] \qquad (7)$$

where $N_{cut}$ denotes a cut section of an object for calculating the feature amount of each section and $n_0$ denotes an image number indicating an image of a start point of a cut section. $n_1$ denotes an image number indicating an image of an end point of a cut section.

Next, the section feature amount generation unit 350 calculates the variance $G^2_H[N_{cut}]$ of the horizontal direction motion of the camera of the section of the calculation object using the average calculated by the above-described Equation 7. The calculation of the variance $G^2_H[N_{cut}]$ is, for example, calculated using the following Equation 8.

$$G^2_H[N_{cut}] = \frac{1}{n_1 - n_0} \sum_{n=n_0}^{n_1} (\overline{G}_H[N_{CUT}] - G_H[n])^2 \qquad (8)$$

In this way, the section feature amount generation unit 350 calculates the variance $G^2_H[N_{cut}]$ as the horizontal direction motion feature amount of the section so as to quantify the horizontal direction motion of the camera of the cut section. In addition, the variance $G^2_H[N_{cut}]$ becomes a large value in the on play section in which the right-and-left motion of the camera is large and becomes a small value in the off play section in which the right-and left motion of the camera is small.

Figure 10C:
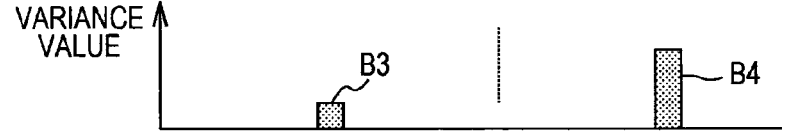

FIG. 10C, a graph (vertical direction motion feature amount (section)) schematically showing the variance of the motion of the vertical direction of the camera of the section S1 and the section S2 is shown. In this graph, a vertical axis denotes the level of the variance of the up-and-down motion of the camera of the section and the feature amount (vertical direction motion feature amount (section S1) B3) of the section S1 calculated from the vertical direction motion feature amount of each image of the section S1 is shown. In this graph, as a comparison object of the horizontal direction motion feature amount (section S1) B3, the vertical direction motion feature amount (vertical direction motion feature amount (section S2) B4) of the section S2 calculated from the vertical direction motion feature amount of each image of the section S2 is shown.

Now, an example of calculating the vertical direction motion feature amount of each section by the section feature amount generation unit 350 will be described. First, the section feature amount generation unit 350 calculates a variance $G^2_V[N_{cut}]$ of the vertical direction motion of the camera of the section of the calculation object, similarly to the calculation of the vertical direction motion feature amount of each section shown in FIG. 10B. That is, the section feature amount generation unit 350 calculates an average "/$G_V[N_{cut}]$" of the vertical direction motion of the camera of the section of the calculation object using the following Equation 9. The section feature amount generation unit 350 calculates the variance $G^2_V[N_{cut}]$ of the vertical direction motion of the camera of the section of the calculation object using the following Equation 10.

$$\overline{G}_V[N_{cut}] = \frac{1}{n_1 - n_0} \sum_{n=n_0}^{n_1} G_V[n] \qquad (9)$$

$$G^2_V[N_{cut}] = \frac{1}{n_1 - n_0} \sum_{n=n_0}^{n_1} (\overline{G}_V[N_{CUT}] - G_V[n])^2 \qquad (10)$$

In this way, the section feature amount generation unit 350 calculates the variance $G^2_V[N_{cut}]$ as the vertical direction motion feature amount of the section so as to quantify the vertical direction motion of the camera of the cut section. In addition, the variance $G^2_V[N_{cut}]$ becomes a small value in the on play section in which the up-and-down motion of the camera is small and becomes a large value in the off play section in which the up-and-down motion of the camera is relatively large compared to in the on play section.

Figure 10D:
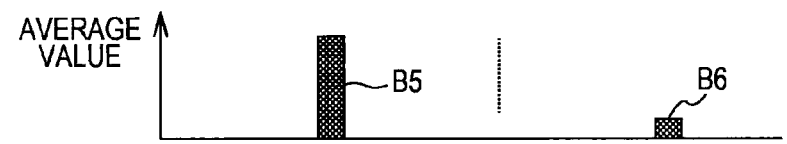

In FIG. 10D, a graph (light-dark feature amount (section)) schematically showing the average of the light-dark feature amount of the image in the section S1 and the section S2 is shown. In this graph, a vertical axis denotes the average of the light and darkness of the image of the section and the feature amount (light-dark feature amount (section S1) B5) of the section S1 calculated from the light-dark feature amount of each image of the section S1 is shown. In this graph, as a comparison object of the light-dark feature amount (section S1) B5, the feature amount (light-dark feature amount (section S2) B6) of the section S2 calculated from the light-dark feature amount of each image of the section S2 is shown. In addition, in FIG. 10D, for convenience of description, the absolute value of the light-dark feature amount of each section calculated by the section feature amount generation unit 350 is shown by a graph.

Now, an example of calculating the light-dark feature amount of each section by the section feature amount generation unit 350 will be described. The section feature amount generation unit 350 calculates an average "/$P_V[N_{cut}]$" of light and darkness of the section of the calculation object from the light-dark feature amount of each image of the section of the calculation object using the following Equation 11.

$$\overline{P}_V[N_{cut}] = \frac{1}{n_1 - n_0} \sum_{n=n_0}^{n_1} P_V[n] \qquad (11)$$

In this way, the section feature amount generation unit 350 calculates the average "/$P_V[N_{cut}]$" as the light-dark feature amount of the section so as to quantify the composition of the light and darkness of the image of the cut section. In addition, the average "/$P_V[N_{cut}]$" becomes a minus value (in FIG. 10D, it is increased because it is an absolute value) in the on play section in which the contrast between the upper portion and the lower portion of the image is large and becomes a value close to "0" in the off play section in which the contrast between the upper portion and the lower portion of the image is small.

Figure 10E:
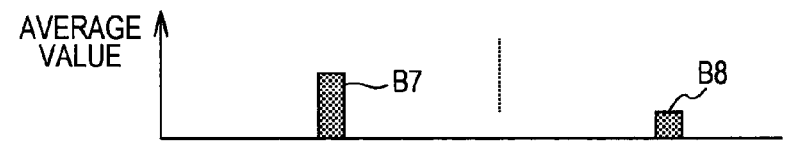

In FIG. 10E, a graph (symmetry feature amount (section)) schematically showing the average of the symmetry feature amount of the image in the section S1 and the section S2 is shown. In this graph, a vertical axis denotes the average of the symmetry of the image of the section and the feature amount (symmetry feature amount (section S1) B7) of the section S1 calculated from the symmetry feature amount of each image of the section S1 is shown. In this graph, as a comparison object of the symmetry feature amount (section S1) B7, the feature amount (symmetry feature amount (section S2) B8) of the section S2 calculated from the symmetry feature amount of each image of the section S2 is shown. In addition, in FIG. 10E, for convenience of description, the inverse of the symmetry feature amount of each section calculated by the section feature amount generation unit 350 is shown by a graph.

Now, an example of calculating the symmetry feature amount of each section by the section feature amount generation unit 350 will be described. The section feature amount generation unit 350 calculates an average "/$P_H[N_{cut}]$" of symmetry of the section of the calculation object from the symmetry feature amount of each image of the section of the calculation object using the following Equation 12.

$$\overline{P}_H[N_{cut}] = \frac{1}{n_1 - n_0} \sum_{n=n_0}^{n_1} P_H[n] \quad (12)$$

The section feature amount generation unit 350 calculates the average "/$P_H[N_{cut}]$" as the symmetry feature amount of the section so as to quantify the composition of the symmetry of the image of the cut section. In addition, the average "/$P_H[N_{cut}]$" becomes a value close to "0" (which is increased in FIG. 10E, because it is inverse) in the on play section in which the symmetry between the left and the right of the image is high and becomes a large value in the off play section in which the symmetry is low.

Example of Feature Amount Generation Based on Voice Data of Each Cut Section by Section Feature Amount Generation Unit FIG. 11 is a schematic diagram showing an example of feature amount generation based on the voice data of each cut section by the section feature amount generation unit 350 according to the first embodiment of the present invention.

In the same figure, the calculation of the feature amount of the section S1 and the section S2 of the moving image content 400 shown in FIG. 3 will be described.

First, the section feature amount generation unit 350 calculates the strength S[n] of cheering using the amplitude feature amount A[n] and the spectrum feature amount F[k; n]. For example, using the spectrum feature amount including the characteristic spectrum in the cheering and the strength S[n] of the cheering, the strength S[t] of cheering for the image n of the analysis object is calculated. Here, t denotes a number indicating the strength of the cheering corresponding to the image n.

The section feature amount generation unit 350 calculates a change amount $S[N_{cut}]$ of the cheering of the cut section of the analysis object using the following Equation 13:

$$S[N_{cut}] = \frac{1}{T_1} \sum_{t=t_1}^{t_1+T_1} S[t] - \frac{1}{T_0} \sum_{t=t_0}^{t_0+T_0} S[t] \quad (13)$$

where $T_1$ denotes a predetermined number of frames near an end point (number of analysis frames near an end point) in the cut section of the analysis object. In addition, $t_1$ denotes a first frame of a time axis (first frame of the analysis frames near the end point) among the frames indicated by the number of analysis frames near the end point. In addition, $T_0$ denotes a predetermined number of frames near a start point (number of analysis frames near a start point) in the cut section of the analysis object. In addition, $t_0$ denotes a first frame of a time axis (first frame of the analysis frames near the start point) among the frames indicated by the number of analysis frames near the start point. In addition, each variable shown in Equation 13 is expressed by the same symbol in FIG. 11.

That is, by using the above-described Equation 13, an average value of the strength of the cheering near the end point (cut change point C12) of the cut section of the analysis object and a difference of the average value of the strength of the cheering near the end point (cut change point C13) of the cut section may be calculated. In this way, the section feature amount generation unit 350 calculates the change amount $S[N_{cut}]$ of the cheering as the feature amount of the cheering of the section so as to quantify the cheering of the cut section. The change amount $S[N_{cut}]$ of the cheering becomes a large value in the section (on play section) which starts with a serve and ends with a score being made and becomes a small value in the off play section which starts with a score being made, gives commentary a replay image, and ends with the serve of the next play.

As described with reference to FIG. 11 and FIGS. 10A to 10E, the section feature amount generation unit 350 calculates the feature amount of each section from the feature amount of each image. The section feature amount generation unit 350 calculates one value (section feature amount) quantitatively showing the section using the feature amount of each calculated section in order to easily analyzes the section.

Now, the calculation of the section feature amount by the section feature amount generation unit 350 will be described. The section feature amount generation unit 350 calculates a section feature amount $R[N_{cut}]$ using the following Equation 14:

$$R[N_{cut}] = \Sigma_{l=0}^{L} W_l H_l(Q_l) \quad (14)$$

where L denotes a total number of feature amounts and l denotes a number indicating each feature amount. The number L of feature amounts is "5" of the variance $G^2_H[N_{cut}]$ of the horizontal direction motion, the variance $G^2_V[N_{cut}]$ of the vertical direction motion, the average "/$P_V[N_{cut}]$" of light and darkness, the average "/$P_H[N_{cut}]$" of symmetry and the change amount $S[N_{cut}]$ of cheer. $W_1$ denotes a predetermined weight of each feature amount. $H_1$ denotes a predetermined non-linear parameter of each feature amount. $Q_1$ denotes a feature amount indicated by a number 1. The weight $W_1$ and the non-linear parameter $H_1$ are values decided with respect to sports.

That is, the section feature amount generation unit 350 performs parameter conversion into non-linearity with respect to each feature through a threshold function or the like using the above-described Equation 14, additionally performs weighted-adding, and sums the calculated values, thereby making the on play of each cut section into scores.

The section evaluation unit 360 executes evaluation of the section using the section feature amount $R[N_{cut}]$ calculated by the section feature amount generation unit 350. Now, the evaluation of the section by the section evaluation unit 360 will be described.

The section evaluation unit 360 evaluates whether or not the section of the analysis object is an on play section using the following Equation 15:

$$R[N_{cut}] \geq Thsd \tag{15}$$

where Thsd denotes a threshold.

In this way, the section evaluation unit 360 sets the section of the analysis object to the on play section, if the section feature amount $R[N_{cut}]$ is equal to or greater than the threshold, using the above-described Equation 15.

The attribute information generation unit 370 generates on play section attribute information from information about the section analyzed as the on play section. For example, the attribute information generation unit 370 generates the on play section attribute information including the number of the on play section, the start time and the end time of the moving image content so as to generate attribute information for identifying the on play section of the moving image content.

In this way, the section feature amount is generated by the section feature amount generation unit 350 and the generated section feature amount is evaluated (compared with the threshold) by the section evaluation unit 360, thereby identifying whether or not the cut section is an on play section. That is, the information processing unit 200 classifies the cut section into the on play section and the off play section.

Although the section feature amount is calculated using the feature amount of each of all the images of the cut section herein, the present invention is not limited thereto. For example, in spite of the various lengths of the cut section, since there is an upper limit in the number of feature amounts which may be held in the image feature amount buffer 340, the feature amount of each of all the images may not be held according to the lengths of the cut section. Therefore, each feature amount may be calculated for each image of a predetermined gap. If the number of feature amounts exceeds the upper limit, although cut change does not occur, the section feature amount may be generated on the assumption that cut change occurs.

Display Example of Display Unit

Subsequently, the example of using the on play section attribute information generated by the information processing unit 200 will be described with reference to FIGS. 12A and 12B and FIG. 13.

Figure 12A:
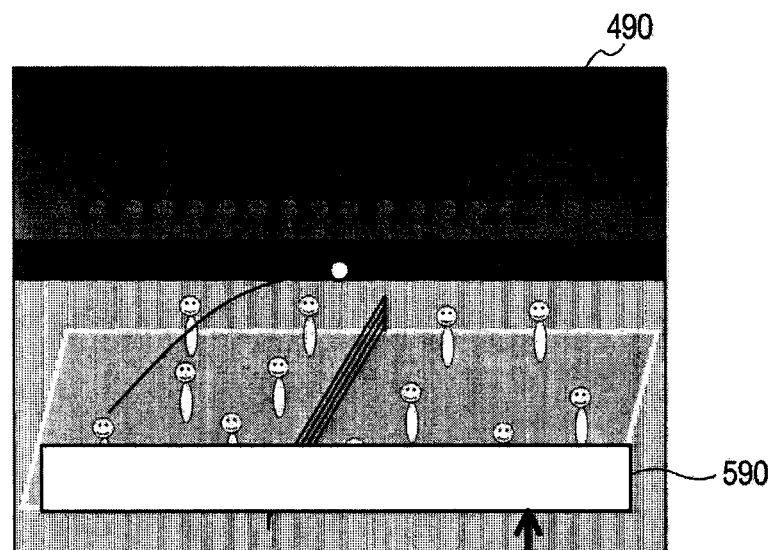
FIGS. 12A and 12B are diagrams showing a display example of moving image content reproduced by an output control unit according to the first embodiment of the present invention.
Figure 12B:
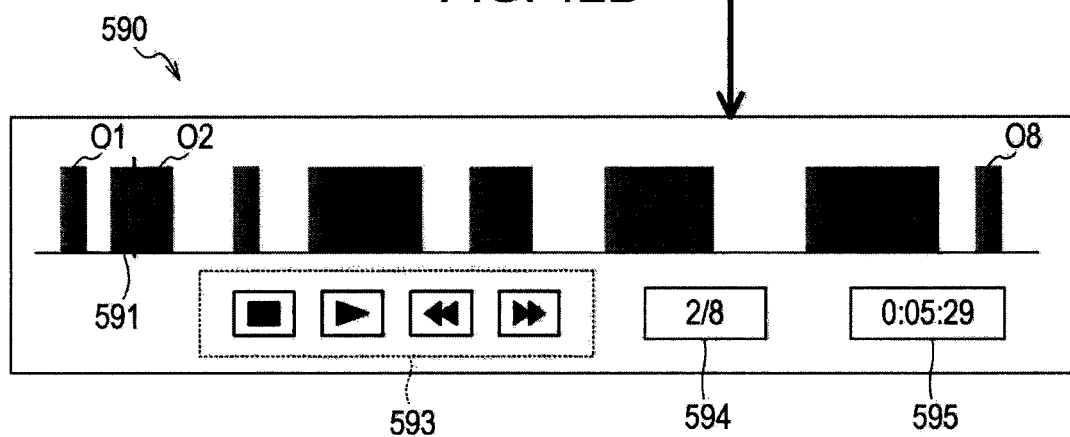

FIGS. 12A and 12B are diagrams showing a display example of the moving image content reproduced by the output control unit 150 according to the first embodiment of the present invention. In the same figure, an example of extracting and reproducing the on play section of the moving image content using the on play section attribute information associated with the moving image content is shown.

In FIG. 12A, an image (image 490) schematically displayed on the display unit 160 in the case where the on play section is selected and reproduced is shown.

The image 490 is generated based on the moving image content supplied from the moving image content storage unit 141 and the on play section attribute information supplied from the attribute information storage unit 142. The image 490 is an example of the image displayed on the display unit 160 when a reproduction instruction operation for reproducing only the on play section of the moving image content is performed. That is, if the reproduction instruction operation is performed, the output control unit 150 acquires the moving image content associated with the reproduction instruction operation from the moving image content storage unit 141 and acquires the on play section attribute information associated with the moving image content from the attribute information storage unit 142.

The output control unit 150 extracts on play sections from the acquired moving image content based on the acquired on play section attribute information. The output control unit 150 creates a display window (image region 590) for consecutively reproducing the on play sections based on the acquired on play section attribute information. Details of the image region 590 are shown in FIG. 12B.

In FIG. 12B, the image region 590 of FIG. 12A is enlarged and shown. In the image region 590, position bars (bars O1 to O8) visually showing the number and positions of on play sections of the moving image content and a current position (current position 591) showing a current reproduction position (position of the moving image content of the displayed image) are shown. In the image region 590, a menu icon (menu icon 593) for selecting the on play section and a region (number display region 594) indicating the number of the currently reproduced on play section and the total number of on play sections are shown. In addition, in the image region 590, a region (time display region 595) showing the time of the currently reproduced image is shown.

By viewing the image region 590, the user may easily select an on play section to be viewed. By referring to the on play section attribute information in the output control unit 150, for example, consecutive reproduction of only the on play section (that is, reproduction of summary moving image of only the image which is being played) may be automatically performed.

In this way, by using the on play section attribute information, it is possible to perform reproduction of only the on play section of the moving image content.

Figure 13:
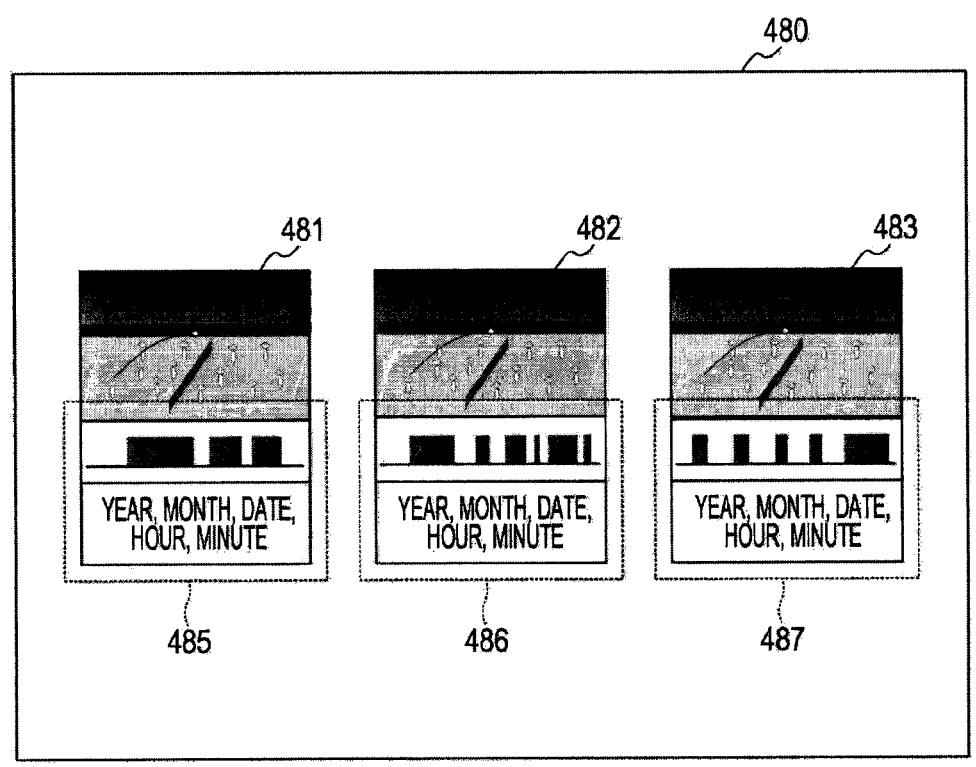
FIG. 13 is a schematic diagram showing an example of an image in selection of moving image content using on play section attribute information according to the first embodiment of the present invention.

FIG. 13 is a schematic diagram showing an example of an image in selection of moving image content using on play section attribute information according to the first embodiment of the present invention.

In the same figure, an example (moving image content selection image 480) of a moving image content section screen for selecting desired moving image content from a plurality of pieces of moving image content is schematically shown.

The moving image content selection image 480 is generated based on the moving image content supplied from the moving image content storage unit 141 and the on play section attribute information supplied from the attribute information storage unit 142, similarly to the image 490 of FIGS. 12A and 12B. That is, if a content list display instruction operation is performed, the output control unit 150 acquires all moving image content from the moving image content storage unit 141 and acquires on play section attribute information associated with the moving image content from the attribute information storage unit 142.

The output control unit 150 generates on play section information (lower portions of representative images 481 to 483) 485 to 487 of the moving image content based on the acquired on play section attribute information. The output control unit 150 displays the representative images (for example, leading frames) 481 to 483 of the acquired moving image content and the generated on play section information 485 to 487 in association with each other.

In the case where the moving image content selection image 480 is displayed, the user selects one piece of moving image content to be viewed based on the on play section information 485 to 487 displayed in association with the representative images 481 to 483.

In this way, by displaying the on play section information along with the list of moving image content, the user may easily identify the outline of the game content. Accordingly, when moving image content to be viewed is selected, the user's favorite moving image content may be selected easily.

Operation Example of Information Processing Device

Next, the operation of the information processing device 100 according to the first embodiment of the present invention will be described with reference to the drawings.

Figure 14:
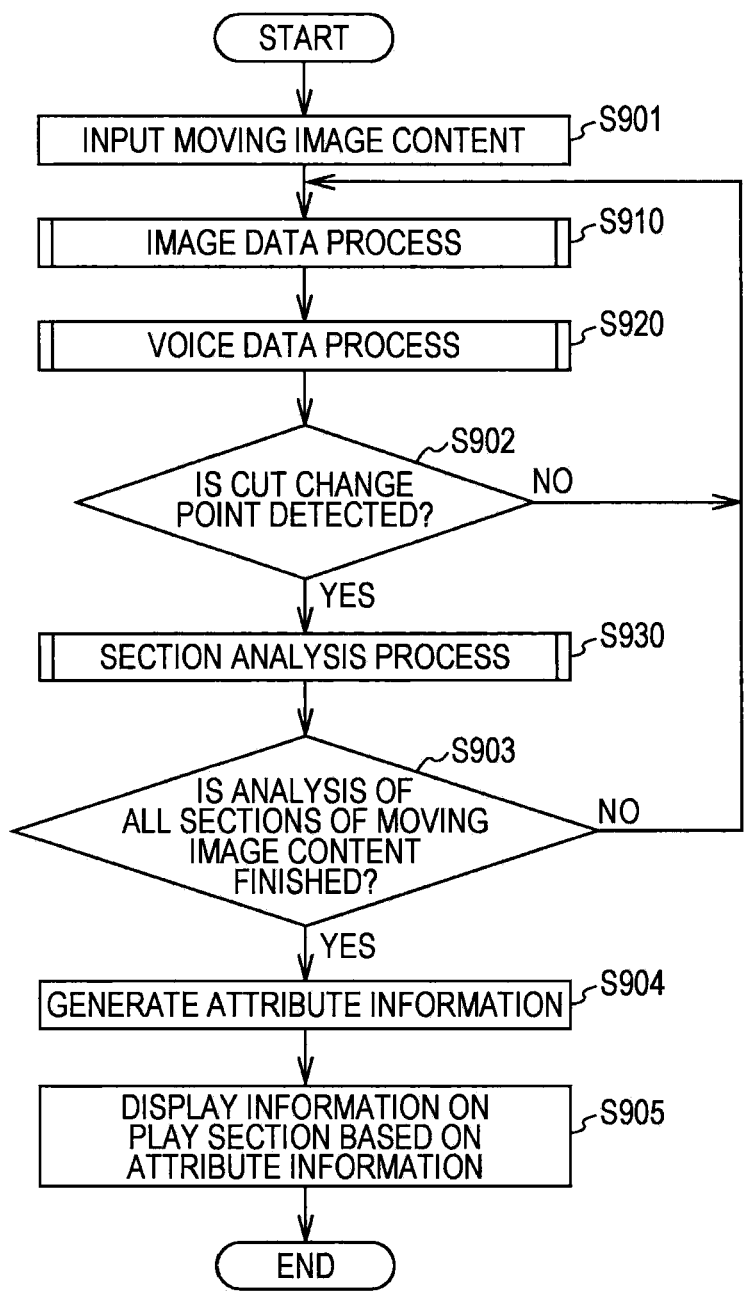
FIG. 14 is a flowchart illustrating an example of an attribute information generation process by the information processing device according to the first embodiment of the present invention.

FIG. 14 is a flowchart illustrating an example of an attribute information generation process by the information processing device 100 according to the first embodiment of the present invention. In FIG. 14, a process from a time when the moving image content is input to the information processing device 100 to a time when a display image including information about the on play section is generated and displayed is shown.

First, the moving image content is input to the input unit 110 (step S901). Subsequently, image data configuring the moving image content is sequentially acquired by the image data buffer 220 of the information processing unit 200 in frame units and an image data process is performed by the information processing unit 200 (step S910). The image data process (step S910) will be described with reference to FIG. 15.

Voice data configuring the moving image content is sequentially acquired by the voice data buffer 310 of the information processing unit 200 at each time corresponding to the frame and a voice data process is performed by the information processing unit 200 (step S920). In addition, the voice data process (step S920) will be described with reference to FIG. 16.

Next, based on the processing results of the image data process and the voice data process, a determination as to whether or not the cut change point is detected is made by the section feature amount generation unit 350 (step S902). If it is determined that the cut change point is not detected (step S902), the process returns to step S910.

In contrast, if it is determined that the cut change point is detected (step S902), a section analysis process of analyzing a section sandwiched between the cut change points is performed by the section feature amount generation unit 350 and the section evaluation unit 360 (step S930). The section analysis process (step S930) will be described with reference to FIG. 17.

Subsequently, a determination as to whether the analysis of all sections of the moving image content is finished is made by the section feature amount generation unit 350 (step S903). If it is determined that the analysis of all sections of the moving image content is not finished (step S903), the process returns to step S910.

In contrast, if it is determined that the analysis of all sections of the moving image content is finished (step S903), the on play section attribute information (attribute information) is generated by the attribute information generation unit 370 (step S904). When the moving image content is reproduced, based on the on play section attribute information, the information about the on play section is displayed on the display unit 160 by the output control unit 150 (step S905) and the attribute information generation process is finished.

Figure 15:
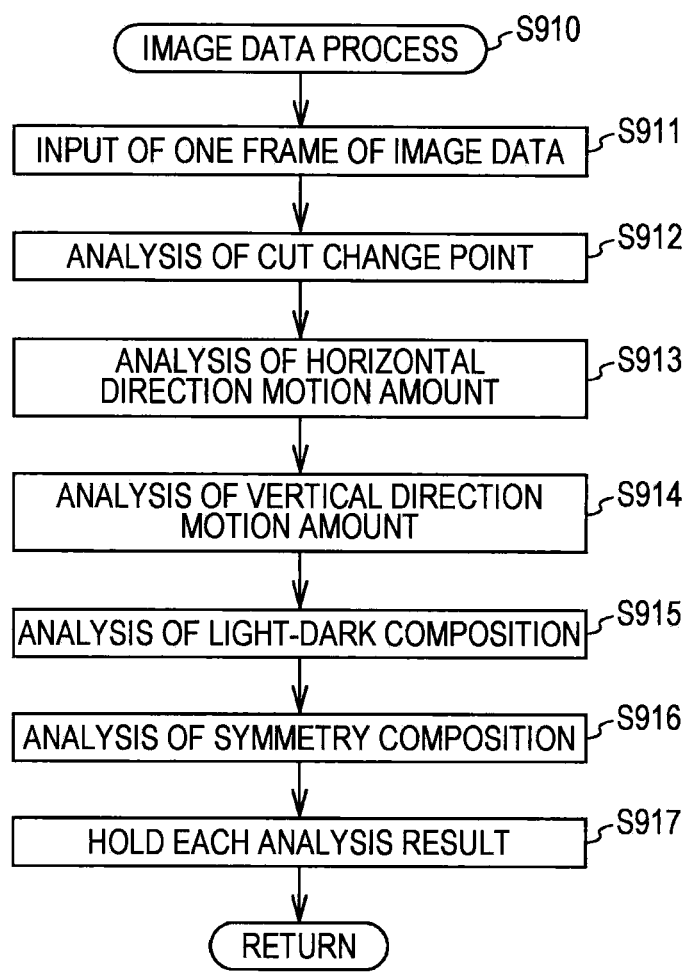
FIG. 15 is a flowchart illustrating an example of an image data process according to the first embodiment of the present invention.

FIG. 15 is a flowchart illustrating an example of the image data process (step S910) according to the first embodiment of the present invention.

First, one image (frame) of the image data of the moving image content is input to the image data buffer 220 (step S911). Subsequently, by using the image output from the image data buffer 220, the presence/absence of the cut change point of the image is analyzed by the cut change analysis unit 230 (step S912). In addition, step S912 is an example of a change point detection step described in the claims.

By using the output image, the horizontal direction motion of the camera for capturing the image is analyzed by the horizontal direction motion analysis unit 250 (step S913). By using the output image, the vertical direction motion of the camera for capturing the image is analyzed by the vertical direction motion analysis unit 260 (step S914). In addition, by using the output image, the composition of the light and darkness of the image is analyzed by the light-dark analysis unit 280 (step S915). By using the output image, the composition of symmetry of the image is analyzed by the symmetry analysis unit 290 (step S916). In addition, step S913 and step S914 are an example of a transition detection step described in the claims. Step S915 and step S916 are an example of a composition similarity degree information generation step described in the claims.

The analysis result (each feature amount) is held by the image feature amount buffer 340 (step S917).

Figure 16:
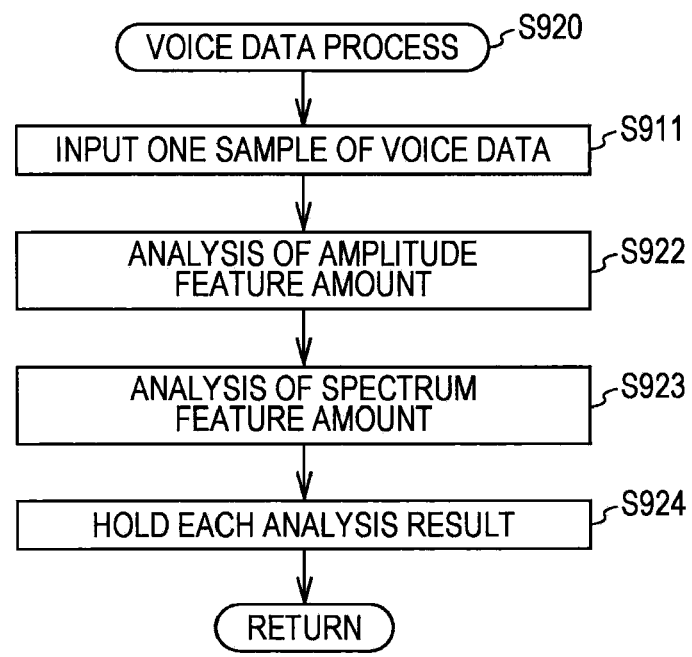
FIG. 16 is a flowchart illustrating an example of a voice data process according to the first embodiment of the present invention.

FIG. 16 is a flowchart illustrating an example of the voice data process (step S920) according to the first embodiment of the present invention.

First, one sample (voice data of one frame period) of the voice data of the moving image content is input to the voice data buffer 310 (step S921). Subsequently, by using the voice data of one sample output from the voice data buffer 310, the feature amount of the amplitude of the voice data is analyzed by the amplitude analysis unit 320 (step S922). By using the voice data of one sample, the feature amount of the spectrum of the voice data is analyzed by the spectrum analysis unit 330 (step S923). Step S922 and step S923 are an example of a voice similarity degree information generation process described in the claims.

The analysis result (each feature amount) is held by the image feature amount buffer 340 (step S924).

Figure 17:
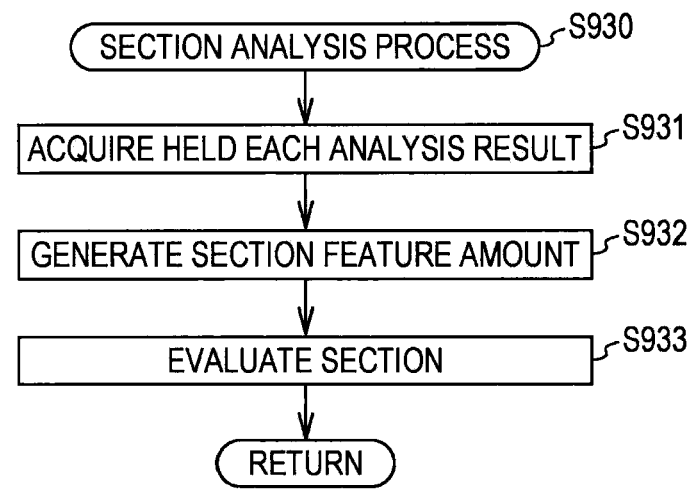
FIG. 17 is a flowchart illustrating an example of a section analysis process according to the first embodiment of the present invention.

FIG. 17 is a flowchart illustrating an example of the section analysis process (step S930) according to the first embodiment of the present invention.

First, each feature amount of the image of the cut section having the cut change point which is determined to be detected in step S902 (see FIG. 14) as an end point is acquired from the image feature amount buffer 340 by the section feature amount generation unit 350 (step S931). Subsequently, by using the acquired feature amount, the section feature amount is generated by the section feature amount generation unit 350 (step S932). By comparing the generated section feature amount with a predetermined threshold, it is evaluated whether or not the cut section is an on play section by the section evaluation unit 360 (step S933). Step S932 and step S933 are an example of a determination step described in the claims.

In this way, according to the first embodiment of the present invention, it is possible to appropriately detect the on play section of a broadcast of volleyball.

Now, the tendency of the volleyball identified by the information processing unit 200 will be described. The information processing unit 200 analyzes the following points (1) to (6) as main features of the on play section of the volleyball broadcast.

(1) In the volleyball broadcast, a rally starts with a serve and ends with a score being made. During the rally, a change in the image detected as a cut change scarcely occurs.

(2) In the volleyball broadcast, in a rally scene, the camera follows a ball and moves in a horizontal direction. This motion amount is also constant to right and left because there is a limitation in the court width.

(3) In the volleyball broadcast, in the rally scene, the camera follows the ball and moves in the horizontal direction and the camera does not substantially move in a vertical direction.

(4) In the volleyball broadcast, in the rally scene, the court is taken in the lower portion of the image and the spectator stand is taken in the upper portion of the image. If the brightness of the upper portion of the image and the brightness of the lower portion of the image are compared, the lower portion of the image is brighter than the upper portion of the image.

(5) In the volleyball broadcast, in the rally scene, the entire court is captured and right-and-left symmetry is high in the composition of the screen.

(6) In the volleyball broadcast, the cheering when the rally ends when a score is made is larger than the cheering when the rally starts with a serve.

The above-described feature (1) is analyzed by the cut change analysis unit 230 as described in FIG. 3. The feature (2) is analyzed by the horizontal direction motion analysis unit 250 as described in FIGS. 4A to 4C and the feature (3) is analyzed by the vertical direction motion analysis unit 260 as described in FIGS. 5A to 5C. The feature (4) is analyzed by the light-dark analysis unit 280 as described in FIGS. 7A and 7B and the feature (5) is analyzed by the symmetry analysis unit 290 as described in FIGS. 8A and 8B. The feature (6) is analyzed by the amplitude analysis unit 320 and the spectrum analysis unit 330 as described in FIGS. 9 and 11. That is, the information processing unit 200 analyzes the above-described features (1) to (6) so as to detect the on play section of the volleyball broadcast.

Although, for example, the volleyball broadcast is described as the moving image content processed by the information processing device 100 up to now, the present invention is not limited thereto. The information processing device 100 is applicable to other sports (for example, tennis or table tennis) in which play starts with serve and the rally ends with a score being made. The above-described features (1) to (6) are slightly different in other sports (for example, in the on play section of tennis, a predetermined amount of movement occurs in the vertical direction). To this end, by changing the weights, the non-linear parameters, the threshold and the like used in the section feature amount generation unit 350 according to the sport, it is possible to detect the on play section similarly to the volleyball broadcast.

2. Second Embodiment

In the first embodiment of the present invention, the information processing device 100 for identifying the on play section is described. In the information processing device 100, by holding the number of the on play section, the start time and the end time in the on play section attribute information, it is possible to identify the on play section of the moving image content. In this case, the information processing device 100 calculates a plurality of feature amounts in order to analyze each section. Therefore, by using the calculated plurality of the feature amounts, it is possible to hold the values which are able to be compared to the on play sections. In the second embodiment of the present invention, an example of holding the values which are able to be compared to the on play sections in the on play section attribute information will be described with reference to FIGS. 18 to 19.

Functional Configuration Example of Information Processing Device

Figure 18:
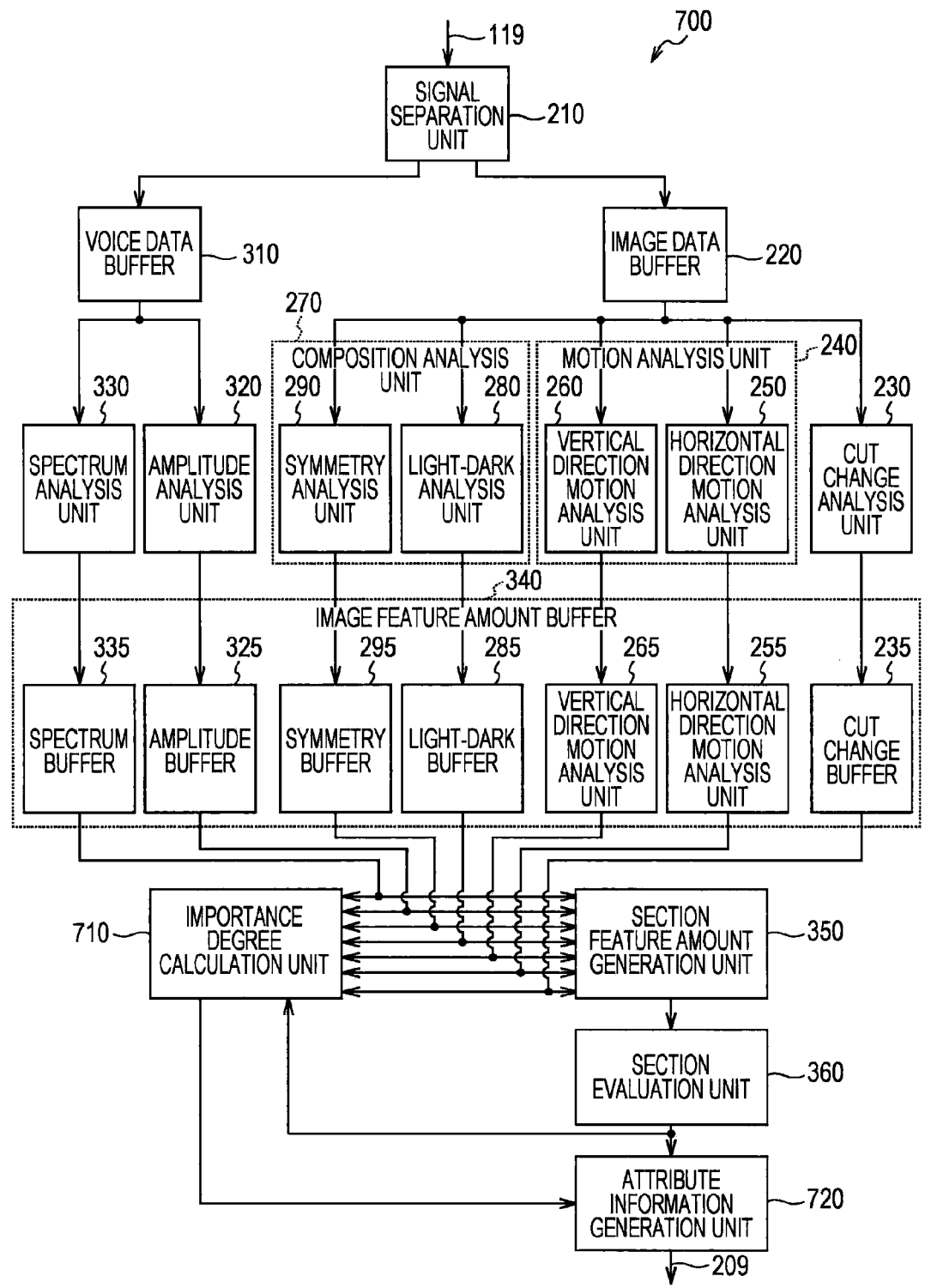
FIG. 18 is a block diagram showing a functional configuration example of an information processing unit according to a second embodiment of the present invention.

FIG. 18 is a block diagram showing a functional configuration example of an information processing unit 700 according to a second embodiment of the present invention. The information processing unit 700 includes an attribute information generation unit 720 instead of the attribute information generation unit 370 of the information processing unit 200 shown in FIG. 2. The information processing unit 700 includes an importance degree calculation unit 710 in addition to the components of the information processing unit 200 other than the attribute information generation unit 720. In FIG. 18, the importance degree calculation unit 710 will be focused upon.

Each feature amount of the image of the cut section is supplied from the image feature amount buffer 340 to the importance degree calculation unit 710, similarly to the section feature amount generation unit 350. When on play section is detected in the section evaluation unit 360, the information about the on play section is supplied to the importance degree calculation unit 710.

The importance degree calculation unit 710 calculates an importance degree of a section which is evaluated as the on play section by the section evaluation unit 360. Here, the importance degree is a value for comparing the on play sections. That is, by using the importance degree, priority of the on play section may be determined. The importance degree is calculated, for example, by quantifying the rally length of an on play section, the time from a start point to an end point of a set, the time from a start point to an end point of a game, service ace, the amplitude and length of cheering, whistling sounds and the like. The importance degree calculation unit 710 calculates the importance degree of the cut section which is evaluated as the on play section by the section evaluation unit 360 from each feature amount of the image data and the voice data of the section. The importance degree calculation unit 710 supplies the calculated importance degree to the attribute information generation unit 720. An example of calculating the importance degree will be described with reference to FIG. 19. The importance degree calculation unit 710 is an example of a priority applying unit described in the claims.

The attribute information generation unit 720 generates on play section attribute information, similarly to the attribute information generation unit 370 shown in FIG. 2. The attribute information generation unit 720 generates the on play section attribute information including the number of the on play section, the start time of the on play section, the end time of the on play section and the importance degree of the on play section.

Example of Calculating Importance Degree

Figure 19:
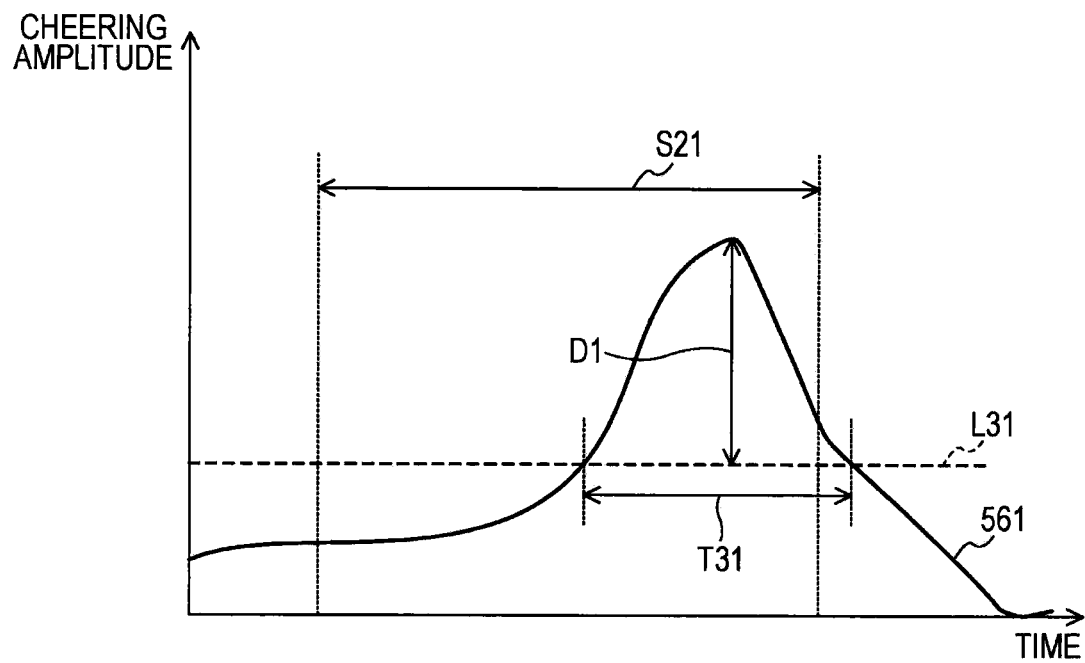
FIG. 19 is a schematic diagram showing an example of generating an important degree based on the amplitude and the length of cheering by an importance degree calculation unit according to the second embodiment of the present invention.

FIG. 19 is a schematic diagram showing an example of generating an importance degree based on the amplitude and the length of cheering by the importance degree calculation unit 710 according to the second embodiment of the present invention.

In the same figure, a horizontal axis denotes a time of moving image content, a vertical axis denotes cheering amplitude, and cheering characteristics 561 indicating a change in cheering amplitude of an on play section (section S21) is shown. In the cheering characteristics 561, a threshold (threshold L31) of the cheering amplitude when the importance degree is calculated, a maximum value (cheer maximum value D1) of the cheering used in the calculation of the importance degree of the cheering characteristics 561 and the length (cheering time T31) of the cheering used in the calculation of the importance degree are shown.

Now, an example of calculating the importance degree based on the cheering amplitude and length will be described. The importance degree calculation unit 710 calculates the importance degree from the cheering amplitude and length using the following Equation 16:

$$A = W_0 A_{max} + W_1 A_{len} \tag{16}$$

where $W_0$ denotes a predetermined weight of the cheer amplitude. $A_{max}$ denotes a maximum value (cheer maximum value) of the cheering of the on play section of an analysis object. That is, the cheering maximum value $A_{max}$ is expressed by a cheering maximum value D1 in FIG. 18. $W_1$ denotes a predetermined weight of the cheering length. $A_{len}$ denotes a cheering length (cheering time) of the on play section of the analysis object. That is, the cheering time $A_{len}$ is expressed by a cheering time T31 in the same figure.

In this way, the importance degree is calculated by the importance degree calculation unit 710. By applying the importance degree to the on play section attribution information, for example, it is possible to reproduce the on play section in descending order of importance degrees.

In this way, according to the second embodiment of the present invention, it is possible to apply the importance degree of each on play section to the on play section attribute information.

In this way, in the embodiment of the present invention, it is possible to appropriately detect the on play section which is a play period from a broadcast program of sports. That is, according to the embodiment of the present invention, it is possible to appropriately detect a specific scene (a play section (on play section) of specific sports).

The embodiments of the present invention are examples for implementing the present invention and, as described in the embodiments of the present invention, the matter of the embodiments of the present invention respectively correspond to specific matter of the invention in the claims. Similarly, the specific matter of the invention in the claims correspond to the matter of the embodiments of the present invention having the same names, respectively. The present invention is not limited to the embodiments and the embodiments may be variously modified without departing from the scope of the present invention.

The processes described in the embodiments of the present invention may be a method having a series of processes or may be a program for executing the series of processes on a computer or a recording medium for storing the program. As the recording medium, for example, a Compact Disc (CD), a Mini Disc (MD), a Digital Versatile Disk (DVD), a memory card, a Blu-ray Disc (registered trademark) or the like may be used.

The present application contains subject matter related to that disclosed in Japanese Priority Patent Application JP 2010-096603 filed in the Japan Patent Office on Apr. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a change point detection unit which detects change points of a moving image;
a transition detection unit which detects transition of a subject included in a plurality of images configuring the moving image included between two adjacent change points among the detected change points;
a composition similarity degree information generation unit which generates composition similarity degree information indicating similarity degrees between compositions of the plurality of images and a composition of a specific scene, based on feature amounts of the compositions of the plurality of images configuring the moving image included between the two adjacent change points;
a voice similarity degree information generation unit which generates voice similarity degree information indicating a similarity degree between voice data associated with the moving image and voice data of the specific scene, based on a feature amount of the voice data associated with the moving image included between the two adjacent change points; and
a determination unit which determines whether or not the moving image included between the two adjacent change points is a moving image corresponding to the specific scene, based on the detected transition, the generated composition similarity degree information and the generated voice similarity degree information,
wherein the determination unit includes:
an evaluation value generation unit which generates an evaluation value for evaluating the moving image included between the two adjacent change points, based on the detected transition, the generated composition similarity degree information and the generated voice similarity degree information; and
an evaluation value determination unit which compares the evaluation value with a threshold value and performs the determination based on a comparison result.

2. The information processing device according to claim 1, wherein the determination unit determines that an on play section which is a playing section of a specific sport is the specific scene.

3. The information processing device according to claim 1, wherein the composition similarity degree information generation unit generates the composition similarity degree information using a result of comparing brightness of a predetermined region and brightness of another region in the plurality of images configuring the moving image included between the two adjacent change points as the feature amounts of the compositions.

4. The information processing device according to claim 1, wherein the composition similarity degree information generation unit generates the composition similarity degree information using a symmetry degree of a specific direction between a predetermined region and another region in the plurality of images configuring the moving image included between the two adjacent change points as the feature amounts of the compositions.

5. The information processing device according to claim 1, wherein the composition similarity degree information generation unit generates the composition similarity degree information using a luminance difference between a predetermined region and another region in the plurality of images configuring the moving image included between the two adjacent change points as the feature amounts of the compositions.

6. The information processing device according to claim 1, wherein the composition similarity degree information generation unit separates the plurality of images configuring the moving image included between the two adjacent change points into a plurality of blocks and generates the composition similarity degree information using an average value of luminance of each block as the feature amounts of the compositions.

7. The information processing device according to claim 1, wherein the transition detection unit detects a horizontal direction motion of an imaging device when capturing the moving image included between the two adjacent change points as the transition of the subject.

8. The information processing device according to claim 1, wherein the transition detection unit detects a vertical direction motion of an imaging device when capturing the moving image included between the two adjacent change points as the transition of the subject.

9. The information processing device according to claim 1, wherein the transition detection unit compares an object image of the moving image included between the two adjacent change points with another image adjacent or close to the object image on a time axis and detects the transition of the subject based on a comparison result.

10. The information processing device according to claim 1, further comprising a priority applying unit which sets the moving image included between the two adjacent change points which is determined as the moving image corresponding to the specific scene as a specific moving image and applies priority of the specific moving image to the specific moving image based on the detected transition, the generated composition similarity degree information and the generated voice similarity degree information.

11. An information processing device comprising:
a change point detection unit which detects change points of a moving image;
a transition detection unit which detects transition of a subject included in a plurality of images configuring the moving image included between two adjacent change points among the detected change points;
a composition similarity degree information generation unit which generates composition similarity degree information indicating similarity degrees between compositions of the plurality of images and a composition of a specific scene, based on feature amounts of the compositions of the plurality of images configuring the moving image included between the two adjacent change points;
a voice similarity degree information generation unit which generates voice similarity degree information indicating a similarity degree between voice data associated with the moving image and voice data of the specific scene, based on a feature amount of the voice data associated with the moving image included between the two adjacent change points;
a determination unit which determines whether or not the moving image included between the two adjacent change points is a moving image corresponding to the specific scene, based on the detected transition, the generated composition similarity degree information and the generated voice similarity degree information; and
a display control unit which performs control such that the moving image included between the two adjacent changes points which is determined as the moving image corresponding to the specific scene is displayed on a display unit, based on a determination result of the determination unit,
wherein the determination unit includes:
an evaluation value generation unit which generates an evaluation value for evaluating the moving image included between the two adjacent change points, based on the detected transition, the generated composition similarity degree information and the generated voice similarity degree information; and
an evaluation value determination unit which compares the evaluation value with a threshold value and performs the determination based on a comparison result.

12. An information processing method comprising:
detecting change points of a moving image;
detecting transition of a subject included in a plurality of images configuring the moving image included between two adjacent change points among the detected change points;
generating composition similarity degree information indicating similarity degrees between compositions of the plurality of images and a composition of a specific scene, based on feature amounts of the compositions of the plurality of images configuring the moving image included between the two adjacent change points;
generating voice similarity degree information indicating a similarity degree between voice data associated with the moving image and voice data of the specific scene, based on a feature amount of the voice data associated with the moving image included between the two adjacent change points;
determining whether or not the moving image included between the two adjacent change points is a moving image corresponding to the specific scene, based on the detected transition, the generated composition similarity degree information and the generated voice similarity degree information; and
setting the moving image included between the two adjacent change points which is determined as the moving image corresponding to the specific scene as a specific moving image and applying priority of the specific moving image to the specific moving image based on the detected transition, the generated composition similarity degree information and the generated voice similarity degree information.

13. A non-transitory computer-readable storage medium having stored thereon, a computer program having at least one code section for image processing, the at least one code section being executable by a computer for causing the computer to perform steps comprising:
detecting change points of a moving image;
detecting transition of a subject included in a plurality of images configuring the moving image included between two adjacent change points among the detected change points;
generating composition similarity degree information indicating similarity degrees between compositions of the plurality of images and a composition of a specific scene, based on feature amounts of the compositions of the plurality of images configuring the moving image included between the two adjacent change points;
generating voice similarity degree information indicating a similarity degree between voice data associated with the moving image and voice data of the specific scene, based on a feature amount of the voice data associated with the moving image included between the two adjacent change points;
determining whether or not the moving image included between the two adjacent change points is a moving image corresponding to the specific scene, based on the detected transition, the generated composition similarity degree information and the generated voice similarity degree information; and setting the moving image included between the two adjacent change points which is determined as the moving image corresponding to the specific scene as a specific moving image and applying priority of the specific moving image to the specific moving image based on the detected transition, the generated composition similarity degree information and the generated voice similarity degree information.

14. An information processing device comprising:
a change point detection unit which detects change points of a moving image;
a transition detection unit which detects transition of a subject included in a plurality of images configuring the moving image included between two adjacent change points among the detected change points;
a composition similarity degree information generation unit which generates composition similarity degree information indicating similarity degrees between compositions of the plurality of images and a composition of a specific scene, based on feature amounts of the compositions of the plurality of images configuring the moving image included between the two adjacent change points;
a voice similarity degree information generation unit which generates voice similarity degree information indicating a similarity degree between voice data associated with the moving image and voice data of the specific scene, based on a feature amount of the voice data associated with the moving image included between the two adjacent change points;
a determination unit which determines whether or not the moving image included between the two adjacent change points is a moving image corresponding to the specific scene, based on the detected transition, the generated composition similarity degree information and the generated voice similarity degree information; and
a priority applying unit which sets the moving image included between the two adjacent change points which is determined as the moving image corresponding to the specific scene as a specific moving image and applies priority of the specific moving image to the specific moving image based on the detected transition, the generated composition similarity degree information and the generated voice similarity degree information.

* * * * *